US011068051B2

(12) United States Patent
Benford et al.

(10) Patent No.: US 11,068,051 B2
(45) Date of Patent: Jul. 20, 2021

(54) AUGMENTED MIRROR

(71) Applicant: Conopco, Inc., Englewood Cliffs, NJ (US)

(72) Inventors: Steven David Benford, Beeston (GB); Anthony Brown, Nottingham (GB); Nils Jäger, Nottingham (GB); Brian Patrick Newby, Wirral (GB); Adam Thomas Russell, Rossett (GB); Louise Mary Schofield, Leicester (GB); Katharine Jane Shaw, Wirral (GB); Paul Robert Tennent, Ridgeway (GB); Michel François Valstar, Nottingham (GB); Ruediger Zillmer, Wirral (GB)

(73) Assignee: Conopco, Inc., Englewood Cliffs, NJ (US)

(*) Notice: Subject to any disclaimer, the term of this patent is extended or adjusted under 35 U.S.C. 154(b) by 0 days.

(21) Appl. No.: 16/065,214

(22) PCT Filed: Dec. 19, 2016

(86) PCT No.: PCT/EP2016/081762
§ 371 (c)(1),
(2) Date: Jun. 22, 2018

(87) PCT Pub. No.: WO2017/108700
PCT Pub. Date: Jun. 29, 2017

(65) Prior Publication Data
US 2018/0373330 A1 Dec. 27, 2018

(30) Foreign Application Priority Data
Dec. 24, 2015 (EP) .................................... 15202690

(51) Int. Cl.
G06F 3/01 (2006.01)
A45D 42/10 (2006.01)
(Continued)

(52) U.S. Cl.
CPC ............ *G06F 3/013* (2013.01); *A45D 42/10* (2013.01); *G06F 1/1605* (2013.01); *G06F 3/011* (2013.01);
(Continued)

(58) Field of Classification Search
CPC ......... G10L 15/00; A45D 42/10; G06F 3/013; G06F 3/017; G06T 7/70; G06K 9/3233
See application file for complete search history.

(56) References Cited

U.S. PATENT DOCUMENTS 8,288,964 B2   10/2012 Hente et al.
2002/0080494 A1   6/2002 Meine
(Continued)

FOREIGN PATENT DOCUMENTS

CN   101902937   12/2010
CN   202698575   1/2013
(Continued)

OTHER PUBLICATIONS

Samsung Display Introduces First Mirror and Transparent OLED Display Panels; Samsung Village; 2015; XP055280797; pp. 1-7 www.samsungvillage.com/blog/2015/06/10/samsung-display-mirror-transparent-oled-display-panels/.
(Continued)

Primary Examiner — Shaheda A Abdin
(74) Attorney, Agent, or Firm — Foley & Lardner LLP

(57) ABSTRACT

An augmented mirror comprising: a partially silvered mirrored surface; a screen underneath the mirrored surface; a camera; and a computer module for receiving data from the camera and for providing graphical images to the screen, wherein the field of view over which visual information is processed is reduced to visual information from within a visual corridor, the visual corridor corresponding to a subset of the field of view of the camera.

16 Claims, 13 Drawing Sheets

(51) Int. Cl.
  *G06F 1/16* (2006.01)
  *G06T 7/70* (2017.01)
  *G06K 9/32* (2006.01)
  *G10L 15/00* (2013.01)
  *H04N 7/14* (2006.01)

(52) U.S. Cl.
  CPC ............ *G06F 3/017* (2013.01); *G06K 9/3233* (2013.01); *G06T 7/70* (2017.01); *G06T 2207/10016* (2013.01); *G06T 2207/10024* (2013.01); *G06T 2207/10028* (2013.01); *G06T 2207/30201* (2013.01); *G10L 15/00* (2013.01); *H04N 7/144* (2013.01)

(56) References Cited

U.S. PATENT DOCUMENTS

| | | | |
|---|---|---|---|
| 2008/0174682 | A1 | 7/2008 | Faisman et al. |
| 2009/0109126 | A1 | 4/2009 | Stevenson et al. |
| 2011/0279630 | A1* | 11/2011 | Friel ........................ H04N 7/144 348/14.08 |
| 2013/0145272 | A1 | 6/2013 | Boggie et al. |
| 2013/0229482 | A1* | 9/2013 | Vilcovsky ............... H04N 7/144 348/14.07 |
| 2014/0080593 | A1 | 3/2014 | Rivera et al. |
| 2014/0180019 | A1 | 6/2014 | Martinez et al. |
| 2014/0207939 | A1 | 7/2014 | Mraz et al. |
| 2014/0226000 | A1 | 8/2014 | Vilcovsky et al. |
| 2014/0379114 | A1 | 12/2014 | Nakamura |
| 2015/0358520 | A1* | 12/2015 | Thimmappa ......... H04N 5/2256 348/217.1 |
| 2016/0360970 | A1* | 12/2016 | Tzvieli .................. G01J 5/0265 |

FOREIGN PATENT DOCUMENTS

| | | |
|---|---|---|
| CN | 104199542 | 12/2014 |
| CN | 104461006 | 3/2015 |
| CN | 104602398 | 5/2015 |
| CN | 104754218 | 7/2015 |
| CN | 105007418 | 10/2015 |
| CN | 204862288 | 12/2015 |
| DE | 102014006453 | 11/2015 |
| JP | 2004357103 | 12/2004 |
| JP | 2008018058 | 1/2008 |
| KR | 20140076849 | 6/2014 |
| WO | WO2014100250 | 10/2014 |

OTHER PUBLICATIONS

Gionvanni et al.; Virtual Try-On Using Kinect and HD Camera; Motion in Games; Nov. 5, 2012; pp. 55-65; XP047022169; China.
Search Report Annex in PCTEP2016081762; dated Feb. 8, 2017.
Greg Duncan; Programming a Kinect Bounding Box; Retrieved from the Internet; Sep. 2, 2011; Retrieved from the internet: https://channe19.msdn.com/coding4fun/kinect/Programming-a-Kinect-Bounding-Box XP055339795 pp. 1-9.
Search Report and Written Opinion in PCTEP2016081762; dated Mar. 27, 2017.
Florian et al.; Gravity Spot: Guiding Users in Front of Public Display Using on Screen Visual Cues; Proceedings of the 28th Annual ACM Symposium on User Interface Software and Techonology; Nov. 5, 2015; pp. 47-56—XP058076922.
Human Interface Guidelines ; Kinect for Windows Human Interface Guidelines ; Mar. 18, 2013; pp. 1-84 XP055353969; United States of America.
Search Report and Written Opinion in EP15202690; dated Oct. 4, 2016.
Search Report in EP15202690 (Partial); dated Jun. 27, 2016.
Search Report & Written Opinion in EP15202669; dated Sep. 30, 2016.
Search Report in EP15202701; dated Jun. 29, 2016.
Search Report & Written Opinion in EP15202709; dated Jun. 29, 2016.
Sato et al.; MR-Mirror: A Complex of Real and Virtual Mirrors; Virtual and MIxed Reality; 2009; pp. 482-491; XP019123164; .; Germany.
Search Report and Written Opinion in PCTEP20161765; dated Feb. 7, 2017.
Partial Search Report in PCTEP2016081764; dated Feb. 2, 2017.
User Defined Gestures for Augmented Virtual Mirrors: A Guessability Study; CHI Human Factors in Computing Systems; 2015; XP058069039.
Mark Fiala; Magic Mirror System with Hand-held and Wearable Augmentations; Virtual Reality Conference; Mar. 14, 2014; pp. 251-253 XP031080324 ISBN: 978-1-4244-0905-1.
Search Report and Written Opinion in PCTEP2016081761; dated Feb. 9, 2017.
Search Report & Written Opinion in PCTEP2016081764; dated Mar. 16, 2017.
IPRP2 in PCTEP2016081761; Mar. 20, 2018.
Kaixi Fan; information Interaction Design; information Interaction Design; 2015; pp. 96-105 (Original and English Human translation of relevant portions only).
New Development Trend of Digital Museum; Beijing Association for Digital Science and Techn. Populzation; pp. 314-316 (total of 7 pgs, original & English human translation of relevant portions only).
Cook; Mobile Robots: Navigation, Control and fremote Sensing; National Defense Industry Press; 2015; pp. 128-135 (total of 12 pgs, Original & human English translation of relevant portions).

* cited by examiner

AUGMENTED MIRROR

FIELD OF THE INVENTION

The present invention relates to an augmented mirror, particularly to an augmented mirror including a partially silvered mirrored surface; a screen underneath the mirrored surface; a camera; and a computer module for receiving data from the camera and for providing graphical images to the screen.

BACKGROUND OF THE INVENTION

A mirror acts as a unique pinch point in the home where activities carried out by a person as part of their daily routine will be reliably and routinely carried out.

For example common activities carried out on a daily basis by a person may include one or more of the following: brushing teeth, brushing hair, shaving, applying make-up.

Furthermore, because mirrors are usually located in specific locations within a house, it is possible to predict, with a reasonable degree of accuracy that a person will be carrying out the everyday activities in a particular location; for example a bathroom, hallway, or bedroom.

Intelligent mirrors are known. For example, US2002/0080494 describes a smart mirror in which is preferably to be placed in the bathroom, since a person spends a certain amount of time in the bathroom preparing for the day. The mirror allows a person to review electronic news and information, as well as their schedule, while preparing for the day, e.g. brushing teeth, shaving, styling hair, washing up, and applying makeup. This aims to address a need for people to be able to plan their day and receive news and information before they leave their homes.

In the prior art mirrors discussed, the user's morning routine is improved since the technology involved in the smart mirror enables them to perform other tasks such as reading/watching the news simultaneously with performing everyday tasks.

The inventors of the present invention have recognised that the unique pinch point provided by a mirror may also be exploited to improve the user's experience of and/or performance of and/or outcome from the everyday tasks themselves. A need exists in the marketplace for smart mirrors capable of interacting with users, particularly users of FMCGs to enhance their experience.

Often, the everyday tasks will involve the use of a handheld object which may include a grooming implement such as a toothbrush, hairbrush, hairdryer, or razor. The grooming implement may or may not be a smart device. In addition, the handheld object may take the form of a fast moving consumer goods (FMCG) container. For providers of FMCGs, the unique pinch point provided by the mirror in the home gives rise to an ideal opportunity for the provider to enhance the user experience of the buyer of their products.

As well as user experience in the home, the inventors of the present invention have also recognised that smart mirrors also have the potential to provide an improved user experience in commercial settings such as hair salons.

Examples of FMCG products which may be used by a user in front of a mirror include: oral care products such as toothpaste and toothbrushes; haircare products, such as shampoo, conditioner, treatment, styling product, styling devices; and skin care products such as age creams, make-up, and deodorant.

There is provided, an improved smart mirror suitable for applications involving user and/or object interaction in both household/consumer space as well as in retail applications.

SUMMARY OF THE INVENTION

Accordingly, the present invention aims to solve the above problems by providing, according to a first aspect, an augmented mirror comprising: a partially silvered mirrored surface; a display screen underneath the mirrored surface; a camera module including a depth scanner for capturing an image and associated depth information of a user of the mirror; and a computer module comprising one or more processors configured to: locate the eyes of a user in an image obtained by the camera module; determine a position in 3D coordinates of the located eyes of the user using depth information obtained by the camera module; determine in 3D coordinates a position of an object of interest imaged by the camera module; calculate, using the 3D coordinates of the user's eyes, a point on the mirror surface at which the object of interest appears to the user; translate the calculated point on the mirror surface from 3D coordinates into 2D coordinates on the display screen; and project an image on the display screen at a desired location relative to the 2D coordinates on the display screen.

According to a second aspect, there is provided an augmented mirror for use with one or more user objects, the augmented mirror comprising: a partially silvered mirrored surface; a display screen underneath the mirrored surface; a camera module including a depth scanner for capturing an image and associated depth information of a user of the mirror; and a computer module comprising one or more processors configured to process images received from the camera module and control images displayed on the display screen; wherein the sole means of communication with the computer module is via the one or more user objects.

According to a third aspect, there is provided an augmented mirror comprising: a partially silvered mirrored surface; a screen underneath the mirrored surface; a camera; and a computer module for receiving data from the camera and for providing graphical images to the screen.

According to a fourth aspect, there is provided an augmented mirror comprising: a partially silvered mirror surface; a screen underneath the mirror; a camera; and a computation module; configured to receive visual information from the camera; process the information; and display one or more images on the display screen based upon the processed information; wherein the field of view over which visual information is processed by the computational module is reduced to visual information from within a visual corridor, the visual corridor corresponding to a subset of the field of view of the camera.

Each of the four aspects described above could be provided, to the extent that they are compatible, in combination with one or more of each other.

Optional features of the invention will now be set out. These are applicable singly or in any combination with any aspect of the invention.

The display screen and mirrored surface may be separate components. Alternatively, the mirrored surface may be a partially silvered coating deposited directly onto the display screen.

In some embodiments, the augmented mirror includes a computer module comprising one or more processors configured to: locate the eyes of a user in an image obtained by the camera module; determine a position in 3D coordinates of the located eyes of the user using depth information obtained by the camera module; determine in 3D coordinates a position of an object of interest imaged by the camera module; calculate, using the 3D coordinates of the user's eyes, a point on the mirror surface at which the object of interest appears to the user; translate the calculated point on the mirror surface from 3D coordinates into 2D coordinates on the display screen; and project an image on the display screen at a desired location relative to the 2D coordinates on the display screen.

In some embodiments, when determining the position in 3D coordinates of the located eyes of the user, a position of the eyes measured in a camera-centred frame of reference is transformed to a mirror-centred frame of reference, and wherein the 3D coordinates are in the mirror-centred frame of reference.

In such embodiments, the calculation of the position of the user's eyes may include video eye tracking. In some embodiments, eye-trackers use a combination of the video image of the centre of the user's pupil and an infra-red reflection from the cornea of the user to determine the direction in which the user is looking at a stimulus on the display screen. The vector connecting the centre of the pupil with the location of the corneal reflections can be used to compute the direction of the view, which may be extrapolated to determine the point on the screen at which the user is looking.

Two general types of infrared eye tracking techniques are known: bright-pupil eye tracking and dark-pupil eye tracking. If the source of illumination (e.g. an RGB-D camera) is offset from the optical path, the type of eye tracking used will be dark-pupil tracking, where the pupil appears dark because the retro-reflection from the retina is directed away from the camera.

The calculation of the 3D coordinates of the user's eyes may take into account the angle of the user's head.

The translation of the calculated x, y z point on the mirror surface from 3D coordinates into 2D coordinates on the display screen requires conversion of the x and y coordinates into pixels on the display screen. The z coordinate is known as it corresponds to the surface of the mirrored surface. The partially silvered mirrored coating should be chosen to have a reflectivity/transparency ratio which is optimised to give maximum reflectivity but still allow a high level of image brightness to be transmitted through the mirror surface. The reflectivity/transparency values will depend on the brightness and contrast ratios of the display element (for example, an OLED screen has a much greater contrast than an LCD screen). The perceived level of transmittance and reflection will depend on the relative light levels both from the display, and in front of the mirror. Partially silvered mirror coatings are well known. An example of a commercially available display screen with a partially-silvered mirrored coating is the Mirror Vision™ screen sold by Aquavision™.

The transmittance value may have a value of 50-80%; particularly 50-60%. The transmittance value may take a value of 10-50%; particularly 20-40%; more particularly 30-40%.

In some embodiments, the light transmittance value is greater than the light reflectance value. The transmittance value may be at least twice as high as the reflectance value. An example of a suitable transmittance value is 66% and an example of a suitable reflectance value is 31%.

In some embodiments, to calculate the point on the mirror surface where the object appears to the user, the computational module is configured to: measure the perpendicular distance from the mirrored surface to the object; compute a 3D virtual position at the same perpendicular distance from the mirror on the opposite side of the mirrored surface to the object; calculate a line of sight from the 3D virtual position to the 3D coordinates of the user's eyes; and determine the point at which the plane of the partially silvered mirror surface intersects this line of sight, the point of intersection corresponding to the point on the mirror surface where the object appears to the user.

To match the pixels of the display screen with the 2D mirror position, the height of the RGB-D device is known, the angle of the device and its position relative to the top left of the screen. Using these fixed parameters, the screen size (which is known) and knowing the distance from the RGB-D to an object enables a "plot" of the object position to be made to in the correct point on the display screen.

The object could be separate to the user e.g. a styling device, a mobile device, a container of a product. The object may, alternatively, be a part of the user themselves e.g. their hair, their clothes, their mouth.

In some embodiments, determination in 3D coordinates of a position of an object of interest imaged by the camera module is achieved by object recognition software run on one of the one or more processors.

In some embodiments, object recognition software is run on a processor separate from the RGB-D camera. In other embodiments, object recognition software may be run on a processor which forms part of a hardware package of the RGB-D camera itself.

In some embodiments, the camera is an RGB-D camera.

In some embodiments, the location of the eyes of the user is achieved by a face-alignment algorithm run on one of the one or more processors of the augmented mirror.

In some embodiments, computation of distance is calculated first in order to determine the 3D coordinates of the eyes of the user.

In some embodiments, translation of the calculated point on the mirror surface from 3D coordinates into 2D coordinates on the display screen is achieved by measuring the distance from a reference point with known 3D coordinates on the mirror surface.

In some embodiments, the augmented mirror further comprises one or more processors configured to: identify objects track movement of the objects; and take control signals from movement of the objects. In this way, the identified object functions as a controller.

In some embodiments, movement of the object controls a jog shuttle response.

In some embodiments, the augmented mirror further comprises an object learning algorithm. In this way, the augmented mirror system can be re-configured to take controls from new objects.

The augmented mirror may include an "off state" during which the system does not respond to the movement of a particular object (or any object) that would usually trigger control.

A mirror system may be provided comprising the augmented mirror in combination with a FMCG container, wherein the FMCG container is the object of interest.

In some embodiments, the FMCG container is a dumb FMCG container. That is to say, an FMCG container with no electrical components and no active communication components. The dumb FMCG container may be a passive object that is only able to communicate with the compute module via the appearance of the dumb FMCG container.

In some embodiments, one of the one or more processors of the augmented mirror has been pre-configured to recognise the shape of and/or markings on the FMCG container.

In some embodiments, the computer module is configured to identify a 2-dimensional printed glyph provided on the dumb FMCG container. The printed glyph may have no rotational symmetry. The computer module may be configured to determine an angular position of the glyph. For example, by analysis of an apparent orientation of the glyph in the images captured by the camera.

Such markings may be visible to the user. In other embodiments, the markings are not visible when viewed solely in the visible spectrum (for example, they may be visible under IR or UV irradiation). This would be accomplished using a suitable dye.

The FMCG may include:
an accelerometer; and
a communications module for communicating wirelessly with the mirror.

In such embodiments, the FMCG is a "smart FMCG". This could include, for example a Bluetooth enabled toothbrush with an accelerometer. The smart FMCG may have only one of a communications module or an accelerometer. It may contain one or more other smart features such as sound sensors, light sensors, a camera, a gyroscope and a chemical analyser.

For example, the FMCG could be a smart toothbrush. Where the smart toothbrush includes an accelerometer, the movement of the toothbrush could be tracked when the user brushes their teeth. Images could be displayed at desired locations on the mirror corresponding to particular locations in the 3D reflection space of the user. In some embodiments, a graphical image is overlaid at the point on the 2D mirror space at which the user sees their reflection. In some embodiments, the FMCG includes a camera.

According to a further aspect of the present invention, there is provided a method of providing a user with targeted information via an augmented mirror, the method providing the steps of:
providing an augmented mirror, the augmented mirror including:
a partially silvered mirrored surface;
a display screen underneath the mirrored surface;
a camera module including a depth scanner for capturing an image and associated depth information of a user of the mirror; and
a computer module comprising one or more processors for:
locating the eyes of a user in an image obtained by the camera module;
determining a position in 3D coordinates of the located eyes of the user using depth information obtained by the camera module;
determining in 3D coordinates a position of an object of interest imaged by the camera module;
calculating, using the 3D coordinates of the user's eyes, a point on the mirror surface at which the object of interest appears to the user;
translating the calculated point on the mirror surface from 3D coordinates into 2D coordinates on the display screen;
projecting an image on the display screen at a desired location relative to the 2D coordinates on the display screen.

The step of calculating the point on the mirror surface where the object appears to the user may include the steps of:
measuring the perpendicular distance from the mirrored surface to the object;
computing a 3D virtual position at the same perpendicular distance from the mirror on the opposite side of the mirrored surface to the object;
calculating a line of sight from the 3D virtual position to the 3D coordinates of the user's eyes; and
determining the point at which the plane of the partially silvered mirror surface intersects this line of sight, the point of intersection corresponding to the point on the mirror surface where the object appears to the user.

In some embodiments, the augmented mirror comprises a computer module comprising one or more processors configured to process images received from the camera module and control images displayed on the display screen; wherein the sole means of communication with the computer module is via the one or more user objects. In this way, security risks are minimised because the data stays in home. Physical products sold have data embedded. The one or more user objects may include one or more FMCG containers.

The computer module may comprise a built-in database of stored applications within a memory of the computer module. An application stored in a memory of the computer module exists in a locked configuration in which is cannot be accessed by a user; wherein a specific interaction between a user object and the augmented mirror provides a key to unlock the application.

In some embodiments, a connection between the computer module of the augmented mirror and the user objects is achieved via any one or more of: light, sound, local electronic means, vibration, object form, object movement and object graphics.

In some embodiments, the connection between the computer module of the augmented mirror and the user object is achieved by local electronic means, the local electronic means comprising one or more of: Bluetooth, Bluetooth LE, Near field communication (NFC) and WiFi.

In some embodiments, an object transmitting the data to the mirror is separate from an object receiving data from the mirror.

In some embodiments, the computer module of the augmented mirror includes a routine learning algorithm for capturing and analysing data from the camera and providing information on the user based on that analysis. In this way, the augmented mirror provides "cold start" functionality".

The augmented mirror may further comprise one or more lighting panels, the lighting panels being controllable by the computer module. In some embodiments, the computer module controls lighting in response to inputs received by the camera. In this way, the lighting acts as a feedback mechanism. The lighting may be triggered by a threshold having been reached. Such thresholds may include time thresholds (e.g. a certain amount of time during which a particular action such as tooth brushing has taken place). Alternatively, or in addition, a threshold which triggers a certain lighting event may be a distance trigger (such as approaching the mirror).

In some embodiments, the light source may provide IR and/or UV light. In this way, the light may provide a data transference mechanism which is not visible to the user since the user's eyes see only light in the visible spectrum.

In some embodiments, lighting panels may provide specific lighting levels to stimulate a reproducible or specific environment. The lighting panels used for this may be separate from those lighting panels used for feedback and/or data transfer so that the different lighting functions can be carried out simultaneously. In this way, by creating reproducible conditions for image capture the user can more accurately assess product performance.

The lighting panels may be thought of external lighting. In some embodiments, the computation module is configured to gradually illuminate the external lighting as the user moves towards an optimal position in which to use the mirror. The gradual illumination may include a linear progression of illumination. In some embodiments, the gradual illumination includes two linear progressions of illumination, the computation module being configured such that the two progressions meet when the user is located at the optimal position.

Furthermore, it is possible to "produce" certain lightfields (e.g. office/home/sunny day/restaurant) to illuminate user which enables the mirror to show a user how they would look in those locations.

In some embodiments, the augmented mirror comprises lights capable of transmitting information to FMCG objects/containers/devices via high frequency flashes, the control of such information being achieved by the computer module. One or more elements of the light panel may be directional and/or focusable.

In some embodiments, the augmented mirror further comprises a light sensor for recording and/or measuring the light reflected from the user. The augmented mirror may therefore provide dynamic monitoring of the current ambient lightfield and optionally, as a consequence, adapt the lighting generated by the mirror.

One or both of the computational module and the camera module may comprise face recognition software.

In some embodiments, the camera provides a visual input and the computer module or the camera includes software for extracting lexicology information from the visual image. In this way, gestures such a "thumbs up/thumbs down" or rotating of a hand can be used to trigger an event or to scroll through options.

In some embodiments, the camera provides a visual image and wherein the computer module includes software for extracting lexicology information from the visual image.

The lexicology information may include gestures made by the user. Optionally, the gestures are hand gestures. The computer module may be configured to determine if a central location of the user's hand is within an area of a graphical image as perceived by the user. Further, the computer module may be configured to trigger a grab action if the user closes their hand when a central location of the user's hand is within an area of a graphical image as perceived by the user. Optionally, the computer module may be further configured to trigger a release action if the user opens their hand.

The compute module may be configured to measure the length of time that a central location of the user's hand is within an area of a graphical image as perceived by the user. Optionally, the compute module is configured to trigger a hover action if the length of time exceeds a predetermined trigger period.

In some embodiments, the computational module is configured to provide two separate output channels and to arrange the two output channels on different sections of the display screen. In this way, a split screen is provided: one screen may be used for time sensitive info such as a dynamic camera feed of the user; the other screen may be used, for example to provide steps/guidance to the user.

The two parts of the split screen could be positioned relative to one another so that one is located above the other or so that they are located side-by side. Alternatively, if an angle-dependant dual screen is provided, the two visual outputs could be sent to respective outputs of the dual screen. A first visual output would be viewable over a first range of angles; and a second visual output would be viewable over a second range of angles, the second range of angles chosen so that there is no overlap with the first range of angles.

In some embodiments, the augmented mirror comprises an audio input. The audio input may take the form of one or more microphones. An audio input could be used as a trigger and/or control. Audio triggers could be voice activated, but other non-voice audio could be programmed e.g. turning on of hairdryer or electric razor.

In some embodiments, the augmented mirror further comprises a transmitter and/or receiver for interacting with external devices over a network and/or via local connections. In this way, the device can receive information feeds via a network e.g. weather forecasts. In addition, the augmented mirror may interact with other devices belonging to the user such as mobile devices (cell phones), tablets, digital cameras, laptops.

Mobile devices with cameras may be used to "see" the back of a user's head.

In some embodiments, the communications module is configured to allow only incoming communications with external devices and/or via local connections.

This could be achieved by constructing a communications module so that it includes only a receiver (no transmitter). Alternatively, if a transmitter/receiver module is used, the one-way communication could be achieved by deactivating a transmitter of the transmitter/receiver module.

In some embodiments the computation module is configured to receive visual information from the camera; process the information; and display one or more images on the display screen based upon the processed information; wherein the field of view over which visual information is processed by the computational module is reduced to visual information from within a visual corridor, the visual corridor corresponding to a subset of the field of view of the camera.

In this way, the level of computational complexity is reduced. Rather than processing visual data from the camera over the entire field of view of the camera, only data from a "visual corridor" of interest is processed.

For mirror applications, the user is only interested in a range of view over which the user's reflection is visible. This is significantly less than the overall field of view of a standard camera e.g. for use with a video game console. Since data outside the visual corridor is thrown away before calculations are performed, the visual corridor results in simplification of calculations as well as a reduction in the memory space required.

In another embodiment, data outside the visual corridor is treated separately and used by the mirror to give context information, e.g., number of people in the room, reflections of the user from other mirrors.

In some embodiments, the camera includes an RGB-D device including input software to extract the skeletal data points of each detected person within the field of view of the camera.

The computational module may also include elimination software configured to: processes the skeletal points extracted by the RGB-D device; extract the position of a specific skeletal region for each user detected by the RGB-D device; discard data corresponding to any user whose specific skeletal region is located outside the visual corridor.

The elimination software may also be configured to: discard data corresponding to any user other than the one whose specific skeletal region is closest to the RGB-D device. That is to say, the user for which the z-coordinate of the specific skeletal region (e.g. the spine) has the lowest value.

The computational module may further comprise: execution software which receives the non-discarded data from the elimination software and processes this data.

The visual corridor is provided by way of maximum x, y and z inputs at the RGB-D device. The visual corridor may be defined, based upon the size and shape of the mirror surface, to match the region over which the user can see their reflection in the mirror.

In some embodiments, the augmented mirror with a "visual corridor" filter may be provided in combination with a portable electronic device such as a smart toothbrush, hairbrush, and hairdryer; or may be a mobile device such as a mobile phone or tablet. The portable electronic device may include features which activate only when they appear in the corridor, e.g., activate interactive brush when it is moved and appears in the corridor.

The portable electronic device may be configured to 'see itself' in the mirror. For example, it may include an LED and a photo receiver. When light from the LED is reflected by the mirror and received by the photo receiver, at least one feature on the portable electronic device will switch from an "off" configuration to an "on" configuration.

One or more of the maximum coordinates (e.g. x, y and z) which set the limit of the visual corridor may be configured to correspond to the locations at which a device can "see itself" so that the device will turn on when it enters the visual corridor.

The visual corridor may correspond to the furthest "left" or "right" a person could be in front of the mirror and still see their reflection (i.e. the "outer limits" of the corridor").

In some embodiments, the augmented mirror is wall mounted.

In some embodiments additional sensors may be embedded within the mirror to capture aspects of the environment around the user and mirror for example odour, humidity and temperature.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 4:
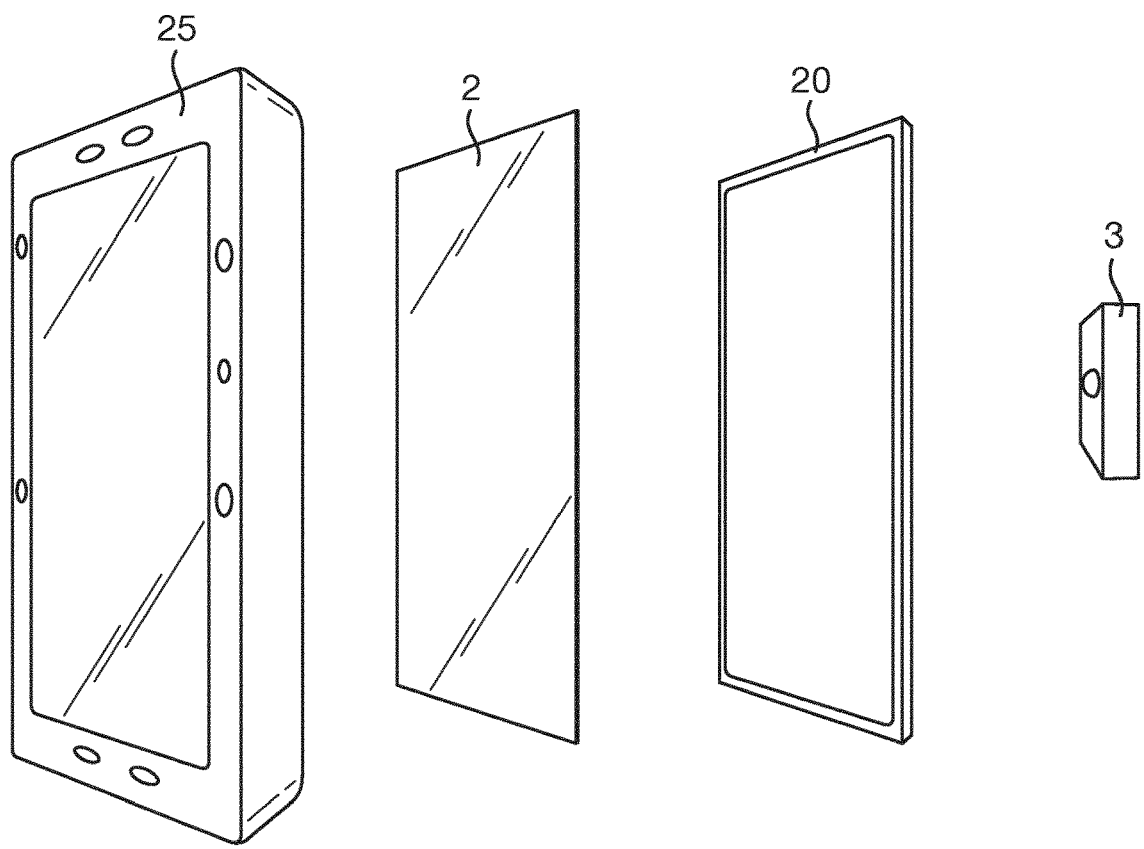
FIG. 4 shows a schematic diagram of housing for an augmented mirror.

An example of an augmented mirror is described below in relation to FIGS. 1 and 4. The augmented mirror 1 comprises a mirrored surface 2 under which a display screen 20 is located, and a camera 3.

Both the display screen 20 and the camera 3 are communicably connected to a computer module 4. The display screen is connected to the computer module 4 via a first connection 21 such as an HDMI cable, and the camera is connected to the computer module by a second connection 22 such as a USB connection.

The camera forms part of a camera module such as an RGB-D device which includes a visual camera and a depth scanner for capturing an image and associated depth information of a user of the mirror. The RGB-D device may be purpose built, or may be a pre-existing product such as a Microsoft Kinect 2 motion sensing input device.

The mirrored surface is partially silvered so that the display screen can be seen through the mirrored surface. In the embodiment shown in FIG. 1, the partially silvered surface is a surface of the display screen itself onto which the partially reflective material has been coated directly. However, it is envisaged that a partially silvered surface could be provided as a separate component from the display screen and then positioned directly in front of the display screen.

The partially silvered mirrored coating should be chosen to have a reflectivity/transparency ratio which is optimised to give maximum reflectivity but still allow a high level of image brightness to be transmitted through the mirror surface. An example of a suitable transmittance value is 66% and an example of a suitable reflectance value is 31%. However, the skilled person would understand that other values would be acceptable.

The computer module comprises one or more processors including a central processing unit (CPU) in communication with a memory and various other components.

These other components may include a power supply, a network interface (in some cases not desired), an input/output interface, an audio interface, and user controls. The mirror may be voice activated, other audio triggers may include turning on of hairdryer.

The computer module is programmed to receive data from the camera 3 and to provide graphical images to the display screen so that they are visible through the (partially silvered) mirrored surface 2. A routine learning algorithm is used for capturing and analysing data from the camera and providing information on the user based on that analysis.

An (optional) housing unit 25 encloses the mirrored surface, display screen and camera. The housing would be advantageous in a bathroom setting to prevent against water damage.

Figure 1:
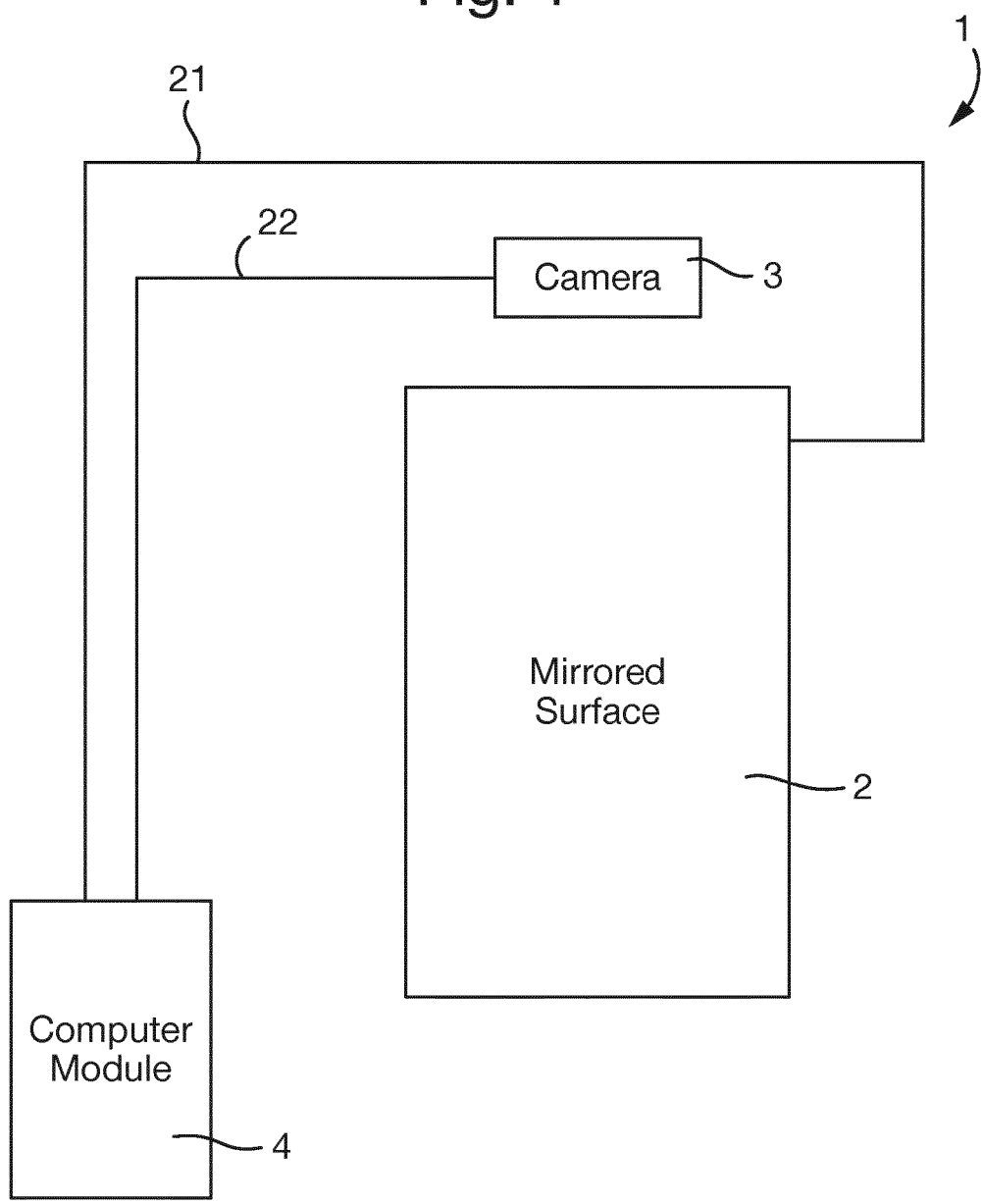
FIG. 1 shows a schematic diagram of an augmented mirror.
Figure 2:
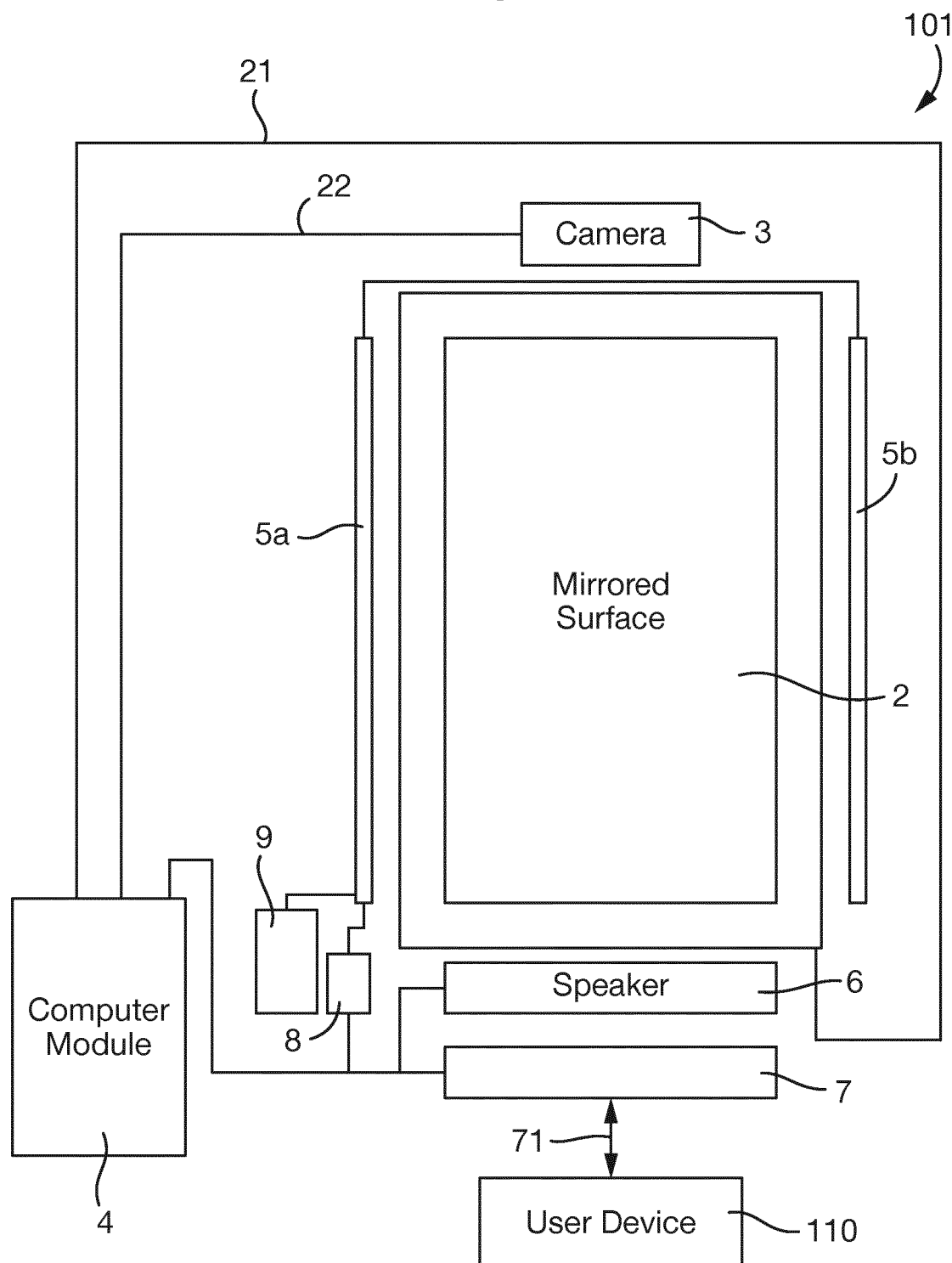
FIG. 2 shows a schematic diagram of an alternative augmented mirror.

An augmented mirror with additional features is described in relation to FIG. 2 where like components are given the same numerals as in FIG. 1.

In addition to the components found in FIG. 1, the augmented mirror of FIG. 2 includes a plurality of light panels in the form of 2 elongate light panels, in this case LED panels, one panel located on either side of the mirror. A lighting controller 8, such as an Arduino™ microprocessor provides an interface between the plurality of lighting panels and the computer module. Connections between the lighting controller 8 and the computer may be USB connections or any other suitable connectors. An additional power source supplies power to the lighting panels.

The computer module may control the light emitted by the lighting panels in response to inputs received by the camera so that the lighting acts as a feedback mechanism. The lighting may be triggered by a threshold having been reached. Such thresholds may include time thresholds (e.g. a certain amount of time during which a particular action such as tooth brushing has taken place). Alternatively, or in addition, a threshold which triggers a certain lighting event may be a distance trigger (such as approaching the mirror).

Each lighting panel may be made up of a plurality of lighting segments, the segments being individually controllable so that certain parts of the lighting panel can be controlled individually. For example, as a user approaches the mirror, the individual segments of the lighting panels may sequentially light up from one and of the panel to another. When all segments within the lighting panels are lit up, this indicates to the user that they are standing in an optimal position.

By way of example, the mirror may include a pair lighting panels, each made up of a plurality of lighting segments. Each panel may be generally linear, and arranged vertically along a respective side of the mirror, for example. When a user is identified as having entered in to the field of view of the mirror, or alternatively within a visual corridor of the mirror (described below), the illumination of the lighting panels may be controlled to indicate to the user that they are approaching an optimal position for interaction with the mirror.

For example, when a user enters the field of view of the mirror, or the visual corridor, then the uppermost and lowermost lighting segment of each lighting panel is illuminated. As the user moves towards an optimal position for interaction with the mirror (for example, the centre of the field of view or visual corridor) the remaining lighting segments of each panel are sequentially illuminated. The sequence of illumination may begin with the uppermost and lowermost segment (as described), with illumination of the lighting panel progressing gradually towards the centre of the panel from the uppermost and lowermost segments, respectively. In other words, as the user moves from their initial position closer towards the optimal position, the uppermost-but-one segment and the lowermost-but-one lighting segment may both be illuminated. As the user continues to move towards the optimal position, the remaining lighting segments are sequentially illuminated. As will be appreciated, as the user moves towards the optimal position the effect of each lighting panel appears to the user as a "pinch" effect, where the lighting segments are sequentially illuminated from the top and bottom of the panel to eventually "meet" at the centre of the lighting panel. The lighting controller may be configured to illuminate the segments of the panel so that the illumination sequence from the top of the panel and the illumination from the bottom of the panel meet at the centre of the panel when the user in the optimal position. The closer the user is to the optimal position, the more the LEDs converge at the vertical centre of the mirror. When the user is successfully located in the optimal position, all, or a portion, of the lighting segments may be switched off.

If a user moves away from the optimal position in front of the mirror, the "pinch" illumination of the lighting may progress in reverse. That is to say that the segments in the centre of the lighting panel are extinguished first, followed by progressive extinguishing of the segments in an upwards and downwards direction towards the uppermost and lowermost segment, respectively.

Such a lighting configuration provides an intuitive method of indicating to a user when they are in the optimal position for interaction with the mirror. Such a lighting configuration can be used to indicate to the user the optimal angular position relative to the mirror, and/or optimal distance for the user from the mirror. The lighting configuration described above forms a feedback mechanism for the user, in so far as the consequences of the user's movement for the optimal operation of the mirror are ergonomically conveyed to the user. In this way, the user is able to place themselves in the optimal position for the mirror without needing to understand that there is an optimal position, or where that optimal position is located. This configuration of the lighting abstracts away from the optimal position concept for the user, and ergonomically and simply allows a user to put themselves in the optimal position.

A use of the lighting described above is shown in the schematic shown in FIG. 11.

Lighting panels may provide specific lighting levels to stimulate a reproducible or specific environment. A light sensor such as a photodiode (not shown) can detect the intensity of light and/or wavelengths of light reflected from a user to provide a measurement of the actual levels and enable specific intensities or hues to be achieved by varying the intensity and/or wavelength of the light emitted by the lighting panels. The lighting panels used for this may be separate from those lighting panels used for feedback and/or data transfer so that the different lighting functions (atmospheric and feedback) can be carried out simultaneously. By creating reproducible conditions for image capture the user can more accurately assess product performance within certain lightfields (office/home/sunny day/restaurant etc.

The lighting controller can be configured to flash or pulse and therefore to transmit information from the computer module 4 to FMCG objects/containers/devices 10, 110 optically via high frequency flashes, the control if such information being achieved by the computer module.

One or more elements of the light panel may be directional and/or focusable. The lighting panels may be highly controllable, adaptable to different scenarios and may interact with applications/programs. For example, the lighting could be used as a timer indicator, with a lighting signal such as full lights or no lights indicating that an activity such as brushing of teeth should be stopped.

In addition to visible light provided by the lighting panels, an additional light source (not shown) may be present to provide IR and/or UV light. Such additional light source(s) provide a data transference mechanism which is not visible to the user.

The embodiment shown in FIG. 2 also includes an audio interface made up of a microphone (not shown) for receiving audio signals such as voice commands from a user, and a speaker 6 for relaying audio information to the user. Both the speaker and the microphone are communicably connected to the computer module 4, for example via a USB connection.

The embodiment of FIG. 2 also included a communication module 7 which enables the augmented mirror to communicate wirelessly with a user device 10. The user device could take the form of a mobile device such as a cell phone, tablet or laptop. Alternatively, it may take the form of a smart FMCG such as a Bluetooth enabled toothbrush. In addition to its own communication module, the smart FMCG may have other smart features such as an accelerometer, sound sensors, light sensors, a camera, a gyroscope and a chemical analyser. Information from one or more of these smart features can be communicated to the computer module of the augmented mirror 101 via the communication module 7. In addition to Bluetooth, other suitable methods of wireless communication can be supported by the communications module 7 such as WiFi, Near field communication (NFC), and Bluetooth LE (low energy).

It is envisaged that any one of or combination of the extra features described in relation to FIG. 2 could be applied to the embodiment of FIG. 1.

The Augmented Mirror allows the use of hand-held devices with built-in cameras and Bluetooth or WiFi data transmission capability to let users see parts of their body that they would not normally be able to see given the location of their eyes. This interaction is easy to use as the user can see in the Mirror Screen both the location of the hand-held device as well as the image captured by this device. This allows the user to easily control and navigate the hand-held device.

Users of the Augmented Mirror can install programs from online repositories. Some programs can interact with the mirror from online servers. To allow this whilst preserving security and privacy, any interaction between such online servers and the Mirror Operating System (OS) has to be done by Mirror OS api calls.

Figure 3:
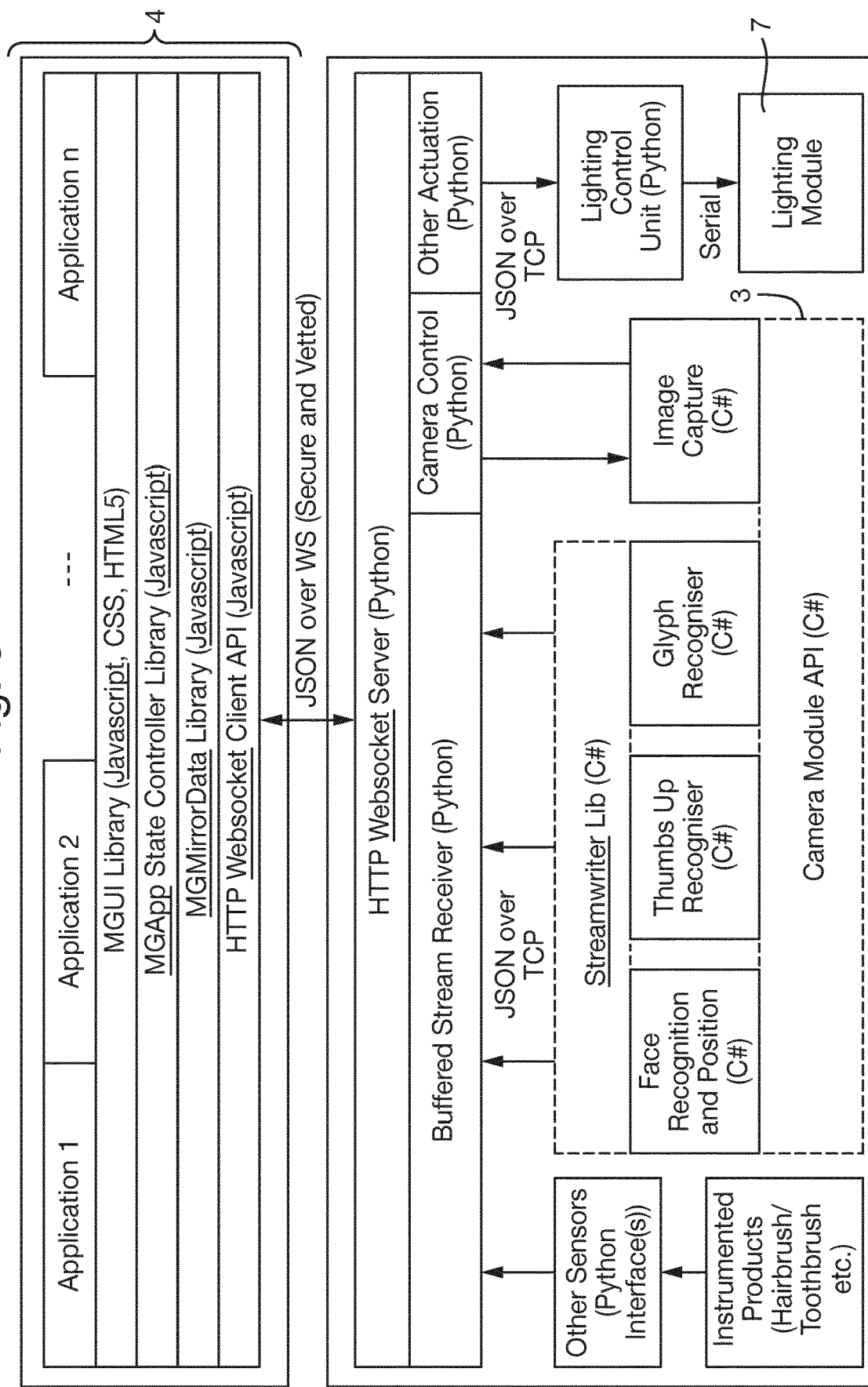
FIG. 3 shows a schematic diagram of software for an augmented mirror.
Figure 9:
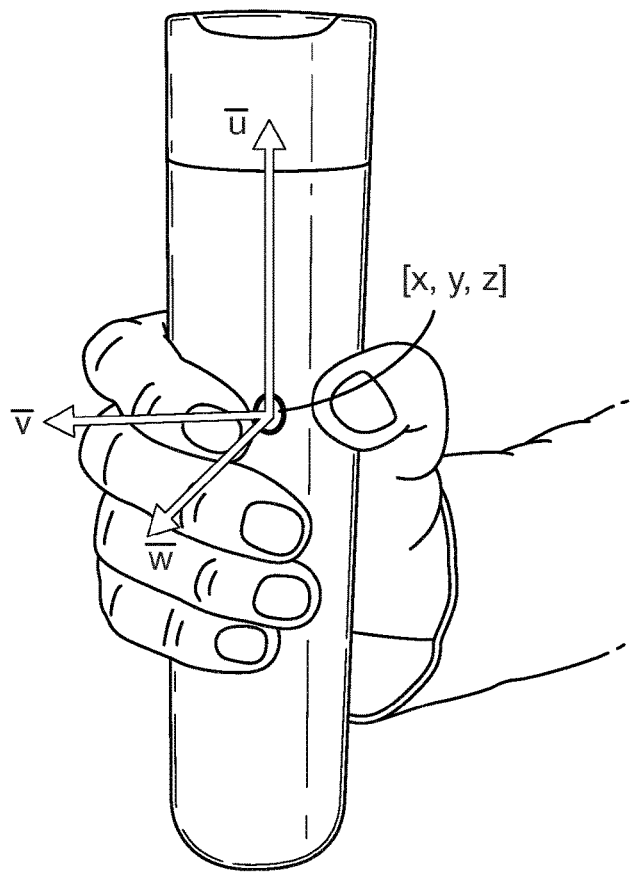
FIG. 9 shows an example of a FMCG container for use with an augmented mirror.

FIG. 3 shows an overview of the Mirror OS software components of the embodiment shown in FIG. 2 where like numbers correspond to those features found in FIGS. 1 and 2. Processing of visual and depth information received by the camera module 3 is achieved in two main stages. At a first stage, software located at the actual camera module itself performs analysis of the data. For example, software at the camera module may include one or more of: Face recognition; Lexicology analysis (one example of which would be a "Thumbs up recogniser"; and a glyph recogniser. In a second stage, further applications may be run within the computer module 4 of the augmented mirror 1, 101. Objects such as FMCG containers can function as 1st class interaction characters in the context of screen-based interactions. The FMCG's presence can be detected by vision sensing; for example by RGB or RGB-D cameras. Alternatively, they could be detected by wireless communication techniques such as Bluetooth, WiFi or NFC. An example of an FMCG container used as a controller is depicted in FIG. 9.

When using RGB-D, location, and orientation of the FMCG container can also be determined.

In some embodiments, the detection of an FMCG container will trigger loading of product-specific programs or online content. It could also enable limited user input to programs displayed on the screen by using the presence or absence of the FMCG as a binary input.

Vision-based sensing would allow the FMCG to be used as a multi-modal controller, where its orientation and location can serve as fine-grained inputs to the programs.

Finally, combining the vision-based sensing of the FMCG's location with visual inputs received from the user (e.g. sensing the user's (head) pose, gestures and facial expressions) allows a third set of inputs to the program.

The operation of the augmented mirror is described in more detail in relation to FIGS. 5 to 8.

In the embodiment shown in FIGS. 5 to 8, the camera 3 of the augmented mirror is an RGB-D scanner with integrated face alignment. As described in more detail below, the computer module, which is communicably connected to the display screen, 20 has been fitted with an algorithm that will allow any user to see digital content related to a real-world object at the correct position relative to this object.

Figure 5:
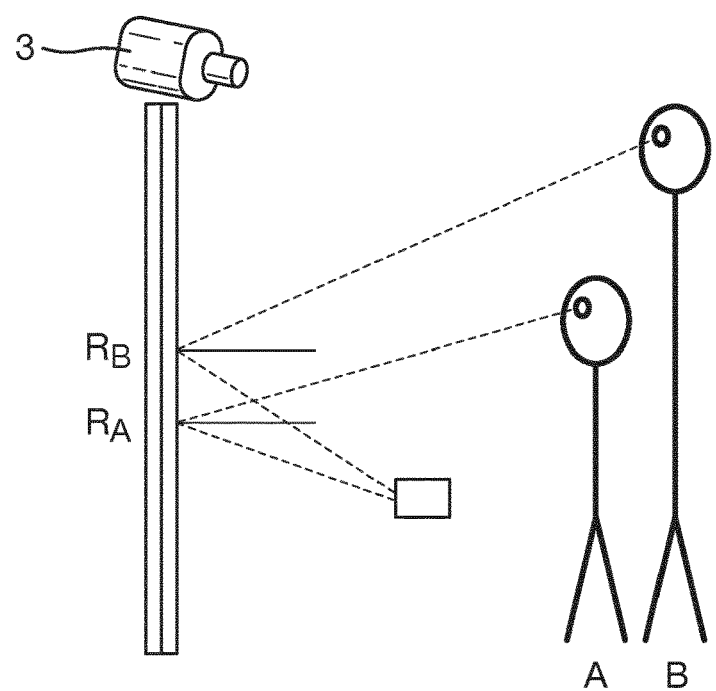
FIG. 5 shows a schematic diagram of two users using an augmented mirror.

This is a non-trivial problem because, as shown in FIG. 5, the projection of the object will be in a different location on the Mirrored Screen depending on the perspective of the user. User A will "see" the reflection of the object at point RA on the mirror, whereas user B will "see" the reflection of the object at point RB of the mirror.

It is the location RA/RB at which the reflection appears for that specific user (i.e. the point at which the path of the light from the object to the user's eyes reflects at the mirrored surface) that must be determined in order to overlay graphics at the correct location. In this way, graphics such as an arrow pointing to the reflection of an object, highlighting a specific part of an object or surrounding a reflection of an object can be reliably produced.

This enables all users to interact with graphics on the screen positioned relative to their reflections with a high degree of accuracy.

The perspective of the user depends on the location of a person's eyes relative to the mirror as well as the location of the object. Thus, to accurately place graphics on the display screen 20 both the eyes and the object must be located in the real-world space, i.e. in terms of 3D real-world coordinates, where the coordinate system is relative to the mirrored surface (MS) the origin is in the centre of the MS, the x-axis parallel to the horizontal side of the MS (in use), the y-axis parallel to the vertical side of the MS (in use), and the z-axis perpendicular to the MS plane.

To detect the eyes of a user (s2), the RGB-D camera's face alignment algorithm is used. This returns the 3D coordinates of the eyes of any user (s3) in view of the camera in a coordinate system centred on the camera. A program running on the computer module 4 of the augmented mirror transforms this measurement by the camera in the camera coordinate system to MS real-world coordinates. This transformation requires a one-off measurement of the relative position of the camera with respect to the MS coordinate system origin. In the embodiments described herein, the origin of the real-world coordinate system is the centre of the mirror's surface. However, another suitable point such as the corner of the mirror could be used as the origin. With this measurement of the camera position with respect to the mirror, the eye positions (as measured by the camera) can be rotated and translated into the real world coordinate system.

Bespoke object recognition software (located in the computer module 4) locates one or more objects (s4), in this case a consumer products (FMCG container). In order for the object recognition software to work with new objects, new object recognition software must be added or existing software must be updated to include (to "learn") the new objects.

Once the location of the user's eyes and the object has been determined, projective geometry is used to calculate the point x° on the mirror/screen where the object is projected (s5). The scene is observed from a RGB-D camera, which provides the 3D coordinates in a reference system relative to the camera (3D Camera World Coordinates) of the head and of the object of interest. The task is to infer the 2D coordinates in the 2D mirror coordinates, where the reference system is in correspondence with or can be mapped on to the pixel locations of the screen.

Given a 3D point on an object as observed by the RGB-D camera, the distance d to the mirror is computed first. Then, the point is translated perpendicularly to the mirror and in its direction by twice this distance (see FIG. 6). The point in the mirror as observed by the user is then computed by finding the intersection between the mirror plane and the line joining the virtual 3D point just computed and the location of the eyes of the user. The resulting point is however still in 3D Camera World coordinates. Its translation to the 2D mirror coordinates (Mirror Space, in pixels) can be directly computed by knowing the location of the centre of the Mirror Screen in terms of 3D Camera Space coordinates and resolution of the Mirror Screen in terms of pixels per inch of the screen (as shown in FIG. 7).

In particular, the coordinates of the mirror plane in the 3D Camera World coordinates are given by a point in the plane and the vector normal to the plane:

$$P_m = \{p, \vec{v}\}, \text{ where } \|\vec{v}\|_2 = 1$$

The specular location of 3D point x is given as:

$$x' = x - 2((x-p)^T \vec{v}) \vec{v}$$

The point in the mirror onto which the reflected object is perceived, $x^0$ is computed as the intersection of the plane Pm and a line:

$$L_1 = \{x', \vec{r_1}\},$$
$$\text{where } \vec{r_1} = \frac{x' - s}{\|x' - s\|_2}$$

Alternatively, the same point can be computed as the intersection between the two following lines:

$$L_1 = \{x', \vec{r_1}\},$$
$$\text{where } \vec{r_1} = \frac{x' - s}{\|x' - s\|_2}$$
$$L_2 = \{s', \vec{r_2}\},$$
$$\text{where } \vec{r_2} = \frac{x - s'}{\|x - s'\|_2}$$

Figure 6:
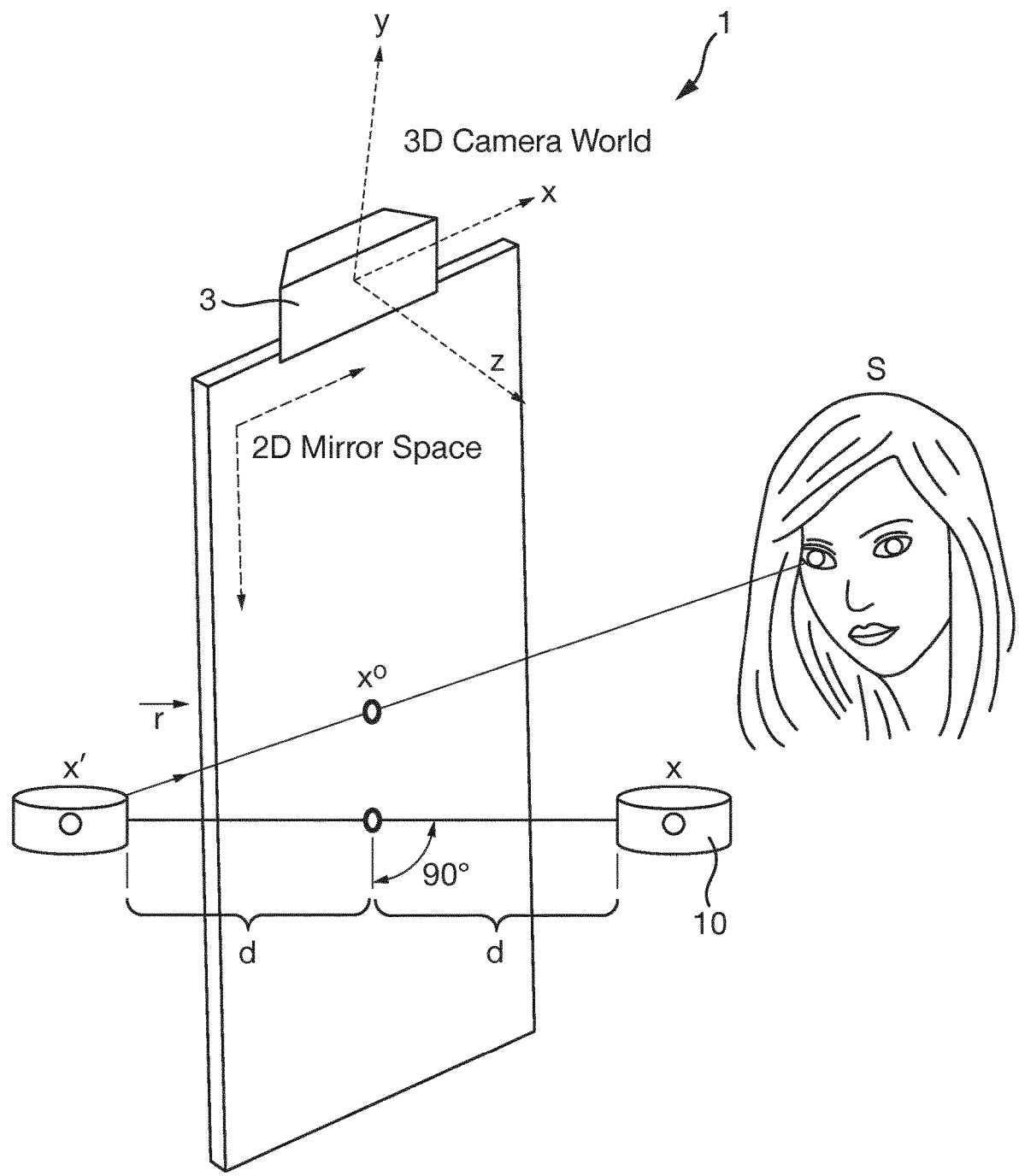
FIG. 6 shows a schematic diagram of a user using an augmented mirror.
Figure 7:
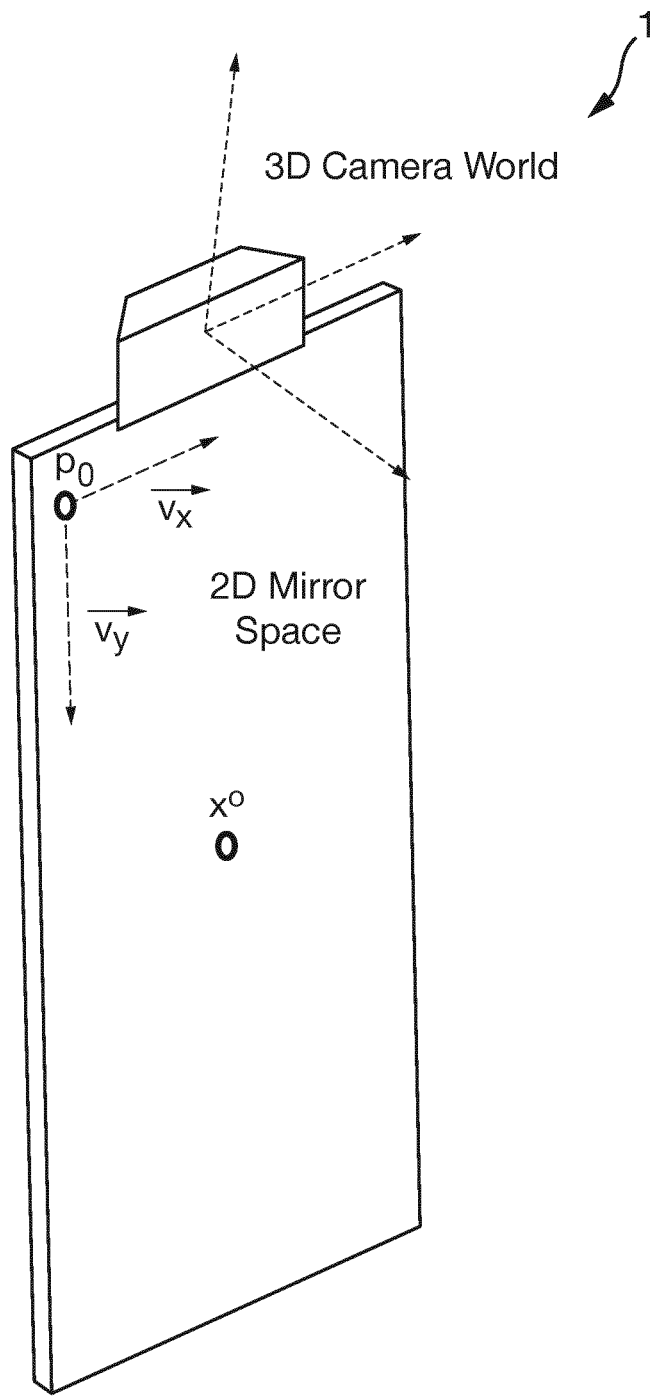
FIG. 7 shows a schematic diagram of co-ordinates of an augmented mirror.
Figure 8:
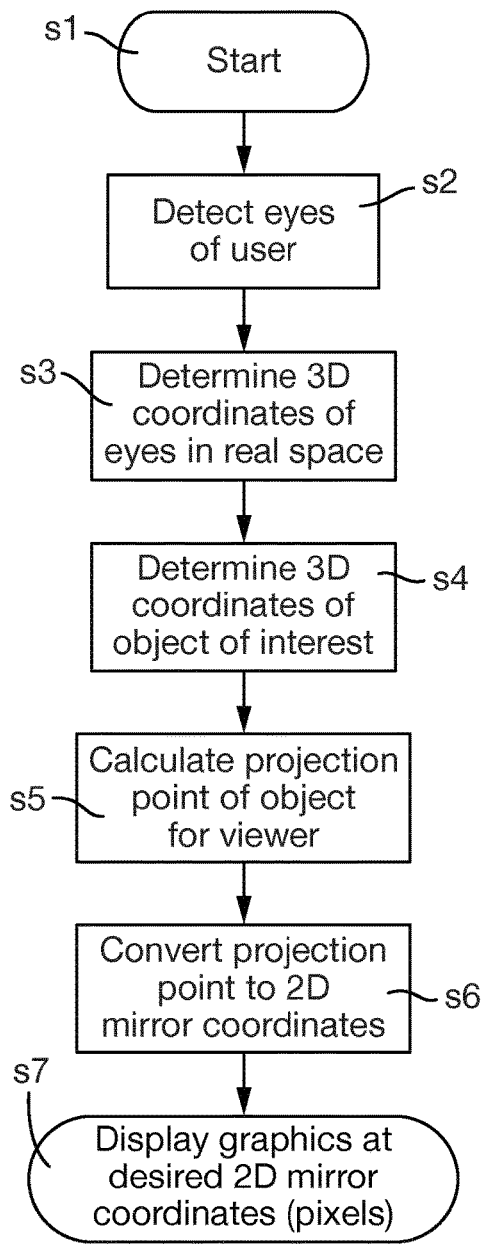
FIG. 8 shows a schematic diagram of a method of determining 2D pixels at which graphics should be positioned for a specific user.

Finally, it is necessary to translate (s6) from the 3D as shown in FIG. 6:

$$(\vec{v}_x' x^0 - p_0, \vec{v}_y' x^0 - p_0)$$

For optimal accuracy, the angle of an object may be taken into account. The conversion into pixels on the display screen 20 therefore involves the determination of the following physical variables:

RGBDF axis angle: The number of degrees the RGBD sensor is tilted down
RGBDF offset Y: The distance in meters that the RGBD sensor is above the top left corner of the mirror
RGBDF offset X: The distance in meters that the RGBD sensor is offset from the top left corner of the mirror
ScreenHeight: The X resolution of the screen in pixels
ScreenWidth: The Y resolution of the screen in pixels
screenDotsPerMeter: the number of pixels per meter square Once these physical variables are known, the following operational steps can be carried out:

The application receives two pieces of information as 3D vectors in meters from the RGBD sensor:
1. The user's eye position
2. The position of the object to overlay Once these information inputs have been established, the six transformation steps are carried out:
1. Rotation and translation of eye positions around RGBDF axis angle to correct for the angle and offset (using RGBDF axis angle, RGBDF offset Y, RGBDF offset X)
2. Rotation and translation of object positions around RGBDF axis angle to correct for the angle and offset (using RGBDF axis angle, RGBDF offset Y, RGBDF offset X)
3. Calculation of the reflected position of the object
4. Calculation of the vector between the new eye position and the reflected position of the object
5. Calculation of the intersection of this vector with the mirror in real world coordinates
6. Conversion of the intersection point to pixel coordinates (using Screen Height, ScreenWidth, screenDotsPerMeter)

These six steps return the x,y coordinates in pixels on the display screen 20 at which a specific user sees the reflection of the object.

The lexicology analysis may include the recognition of a number of gestures on the part of a user. Such gestures may include, for example, a thumbs up gesture (to indicate acceptance, or a positive answer), and a thumbs down gesture (to indicate denial, or a negative answer). It will be appreciated that other gestures may also be recognised by the lexicology analysis. The gestures may not be limited to hand gestures, for example, the lexicology analysis may recognise facial/head gestures, for example, nodding or shaking of the users head to indicate positive and negative responses. The ability to extract lexicological information allows a user to interact with the mirror in an extremely intuitive and ergonomic way. In particular, little teaching is required before a user can use such a mirror because the lexicology analysis is able to recognise actions with which the user may already be familiar from their day-to-day life. In other words, a user does not have to learn a special set of commands in to order to interact with the mirror including the lexicology analysis.

Two particular lexicological interactions are described in detail below. Both interactions require the identification of the position of a user's hand, as seen by the user, in the image reflected from the mirror, and perceived interaction between the user's hand an image displayed on the screen that is coincident with the user's hand (as perceived by the user from their viewing position).

As a first calculation, the real-world 3D position of the user's eyes is determined, according to the method described above. In a similar manner, the real-world 3D position of a user's hand is also determined. In one example, the position of the centre of the user's hand is determined. In another example, the position of the centre of the user's palm is determined.

In accordance with the methodology described above, the position of the user's hand or palm in reflected space is calculated. In turn, the 2D position of the hand/palm's reflection on the surface of the mirror is calculated. The 2D position on screen generally corresponds to the coordinates on the screen at which the user sees the reflection of the hand (from their perspective from the real-world 3D position of the user's eyes).

The 2D position of the hand on the screen may then be used a point of interaction. On the screen of the mirror, an interface component may be displayed. Such an interface component may generally correspond to a region of the graphical display with which a user may interact. Examples of interface components include buttons, toggles, handles (which may be turned), knobs (which may be turned). The skilled person will appreciated that there is a range of interface components that are possible. Each interface component has a position on the screen, and the user can see the interface component at that position. For example, an interface component has an interaction object centre, defined by 2D screen coordinates (Ix, Iy). The interface component is also displayed with a finite size on the screen: a rectangular interface component, for example, has an interaction object width, Iw, and an interaction object height, Ih. It will be appreciated that other interface component shapes are equally possible, for example circular interface components.

Figure 10:
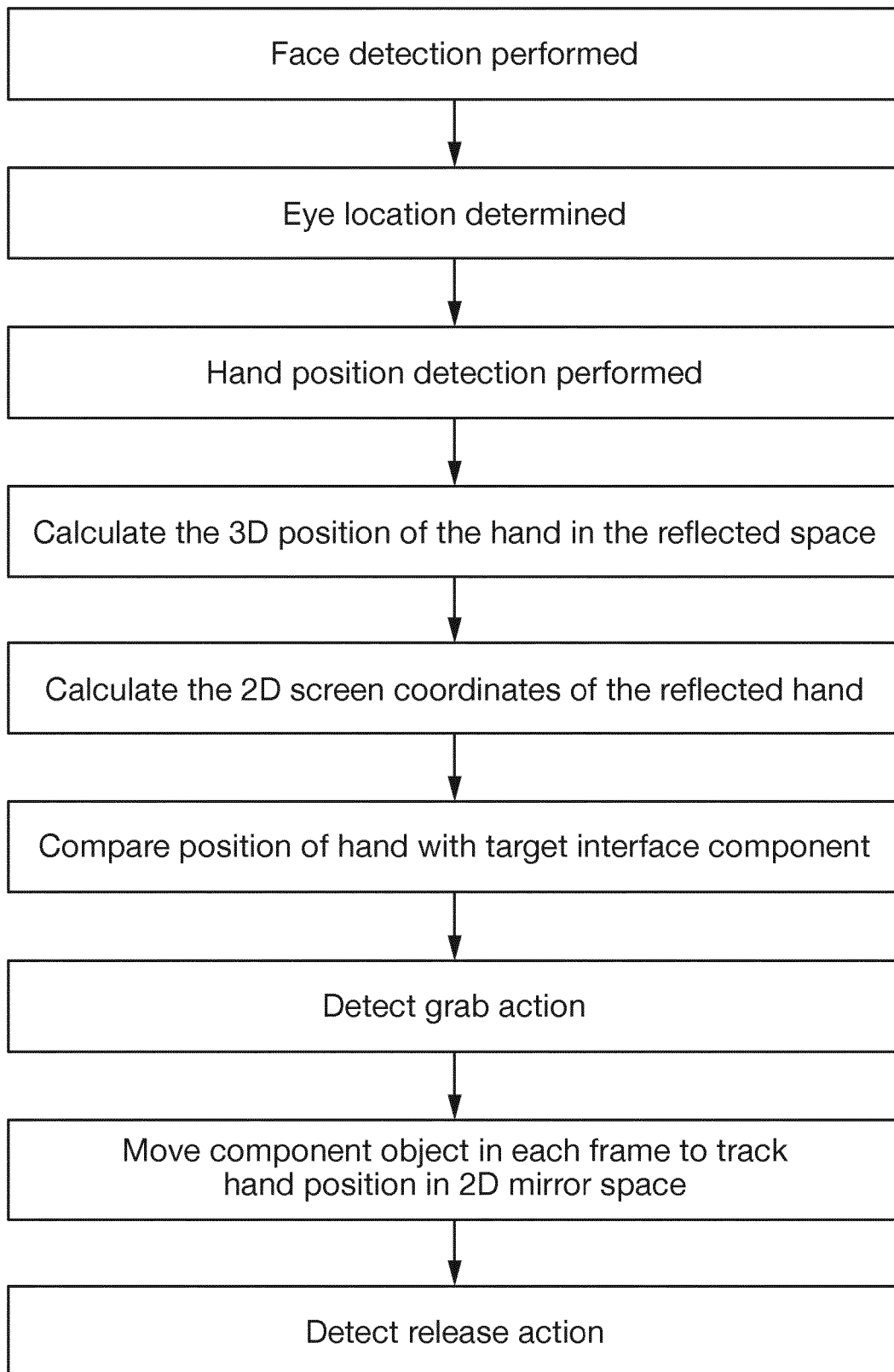
FIG. 10 shows a schematic diagram of a method of lexicology analysis.

Two example modes of interaction with an interface object are described, which each mode utilising the point of interaction. The first mode interaction is "grabbing", which is illustrated in the schematic shown in FIG. 10. In the grabbing mode, the user aligns the reflection of their hand (as seen from the user's eye position) with an interface component with which they wish to interact. When the user perceives alignment between the reflection of his/her hand and the interface component, he/she can close their hand into a first to interact with the interface component. For example, closing the first may cause the interface component to be "grabbed". Conversely, when the user opens his/her hand, the interface component is "released". The grabbing and releasing functions effectively implement a drag-and-drop functionality for the mirror. The closing of the user's hand may also cause a different interaction with the interface component, for example closing the hand may cause a button press of the interface component.

Figure 11:
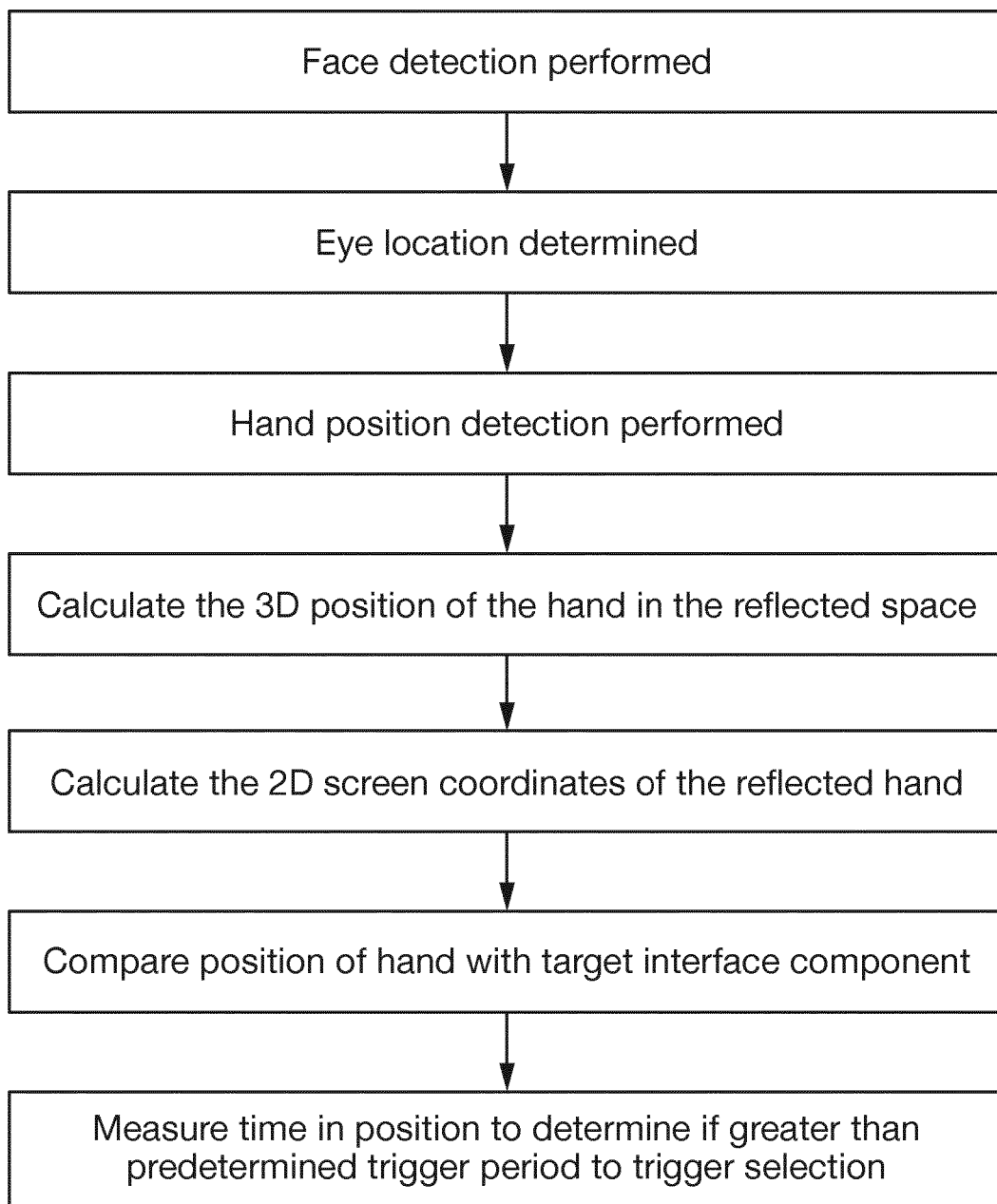
FIG. 11 shows a schematic diagram of a second method of lexicology analysis.

An example methodology of implementing the hovering mode of interaction is shown in FIG. 11. The method begins with face and eye detection and position measurement, and concludes measuring the time that the user's hand is in-position hovering over the interface component to determine if that period exceeds the predetermined trigger period, before triggering selection of the interface component.

The second mode of interaction is "hovering", which is illustrated in the schematic shown in FIG. 11. In the hovering mode, the user aligns the reflection of their hand (as seen from the user's eye position) with an interface component with which they wish to interact. When the user perceives alignment between the reflection of his/her hand and the interface component, he/she can hold their hand still over the interface component. The mirror is configured to measure the period of time during which the user holds their hand over the interface component. When the user has held his/her hand over the interface component for at least a predetermined trigger period an interaction with the interface object is triggered. For example, the object may be "grabbed" or selected. The hovering function implements simple interaction with the mirror using only the user's reflection as perceived by the user.

The method shown in FIG. 11 begins with face and eye detection and position measurement, and concludes measuring the time that the user's hand is in-position hovering over the interface component to determine if that period exceeds the predetermined trigger period, before triggering selection of the interface component.

For both the grabbing and hovering modes of interaction, a degree coincidence of the reflection of the user's hand and the interface component is calculated.

Assuming the interaction point is rectangular, the following are known:
Reflected hand centre 2D coordinate=(Hx,Hy)
Interaction component centre 2D coordinate=(Ix,Iy)
Interaction component width=Iw
Interaction component height=Ih For example, the interaction between hand and interface component is triggered when the follow condition is true:

$$(Hx+(Iw/2))<(Ix+(Iw/2)) \text{AND} (Hx-(Iw/2))>(Ix-(Iw/2))$$
$$\text{AND}(Hy+(Ih/2))<(Iy+(Ih/2))\text{AND}(Hy-(Ih/2))>$$
$$(Iy-(Ih/2))$$

The above condition essentially amounts to determining if the reflected hand 2D coordinate is within the rectangular interaction component, as perceived by the user.

In the case of the hovering functionality, there may also be predetermined trigger period condition implemented, as described above.

Both the grabbing and hovering modes of interaction are highly ergonomic and intuitive for the user, whom is able to interact easily with the mirror without the need to learn specific commands.

The interface component may be a part of the user displayed on the screen.

In some embodiments, where security is an important consideration, the augmented mirror forms part of a walled system. Examples of such systems are described below with reference to FIGS. 12 and 13.

Figure 12:
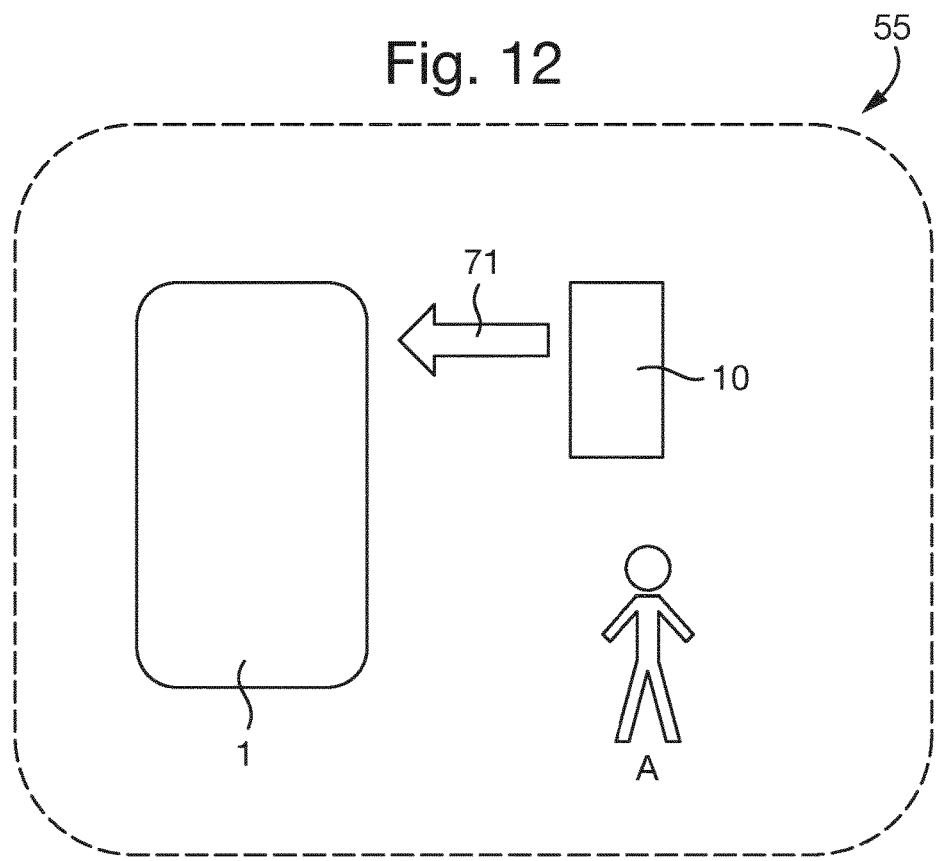
FIG. 12 shows a schematic diagram of a walled system including an augmented mirror.

The system of FIG. 12 includes an augmented mirror (such as any of those described above in relation to FIGS. 1 to 4) where a display screen 20 is located underneath a mirrored surface and a camera module including a depth scanner for capturing an image and associated depth information of a user of the mirror. The augmented mirror 1 will comprise a computer module 4 which itself includes one or more processors configured to process images received from the camera module and control images displayed on the display screen.

Where the augmented mirror 1 forms part of a walled system, the sole means of communication between the outside world and the computer module is a connection to the one or more user objects 10. In this case, the user objects 10 are physical products (such as FMCGs) sold with data already embedded.

As described elsewhere within this application, the connection between the augmented mirror 1 and the object 10 could, for example be an optical connection or a wireless data connection. In the embodiment shown in FIG. 12, data from an object 10 can be received by a communication module 7 on the augmented mirror i.e., the traffic of data is one way, with only the mirror receiving data from the product. This embodiment may be preferred for users for whom security is a concern since no data is sent to the product.

By avoiding a network connection between the computer module 4 of the augmented mirror 1 and any other devices, security risks are minimised because the data stays in home. That is to say, increased privacy is provided since there is no need to connect to internet of things.

This mechanism of data transfer is most feasible where the one or more user objects include FMCG containers since the containers of the products are regularly purchased and can therefore provide constant and regular updates. In other words, the present invention is not concerned with "big data"; instead it aims to help a user (who is also a consumer of FMCG), to get the most out of the FMCG products.

Figure 13:
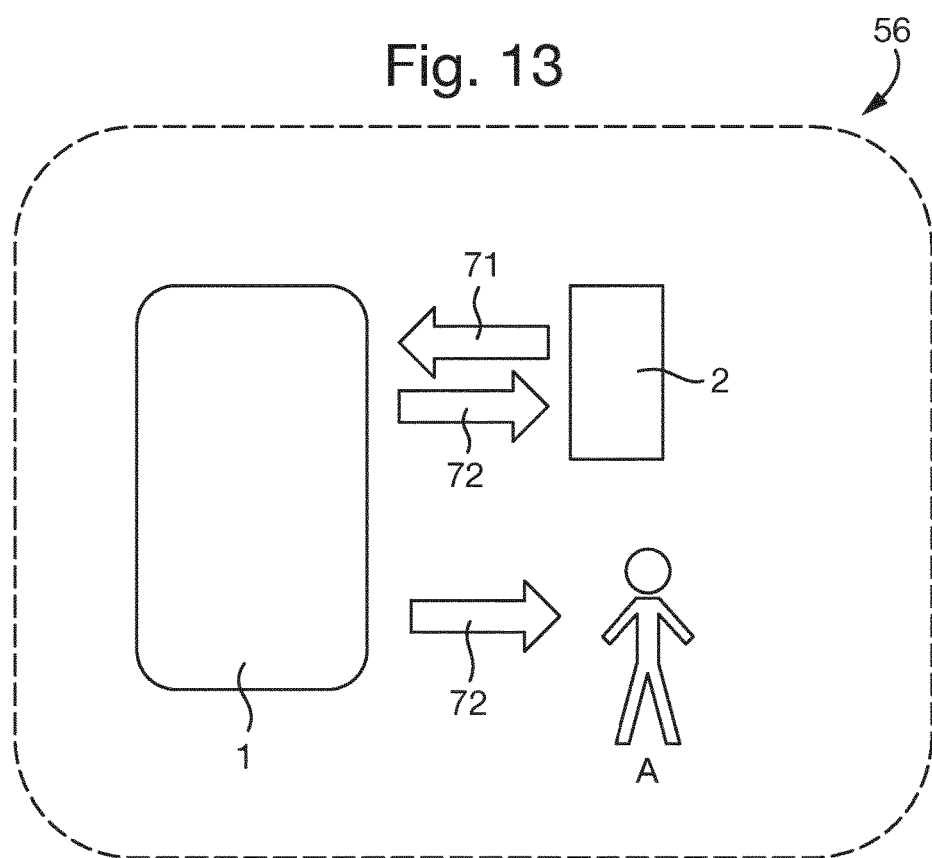
FIG. 13 shows a schematic diagram of an alternative walled system including an augmented mirror.

The embodiment shown in FIG. 13 differs from the embodiment shown in FIG. 12 in that, the augmented mirror is capable of transmitting data 72 to the user and to the object 10.

In the embodiments shown in FIGS. 12 and 13 computer module 4 comprises a built in database. The database may include personal information of user which may be entered into the database by the system actively or passively ("cold start").

The database may have pre-compiled software templates which can be modified and activated by data from products (as described in more detail below). The processor may utilise user information to optimise/personalise software updates. In addition, the database may consist of a range of applications related to different use cases (tooth brushing, skin cream application, hair styling).

In some embodiments, the product can be passive, data transfer triggered/managed by mirror.

Data located on the product may be encrypted and may contain an ID key associated with the data. In this way it is possible to avoid the risk of hacked/false products tampering with the mirror. In some embodiments, a one-way (i.e. a receiving only) network connection can be used to update ID keys at the mirror.

In some embodiments, the augmented mirror may comprise hardware updates (e.g. diagnostic sensors) which are activated upon the receipt of data from FMCG product.

In some embodiments, certain algorithms/variables/attributes of these applications running from a memory of the augmented mirror would have a generic base setting. If data is received from an FMCG object, this would then update and "personalise" that particular application. The variable/new algorithm/attribute information would be contained directly in the FMCG object. The transfer of information could be achieved via wireless data transmission (e.g. Bluetooth) or visually (e.g. encoded in a barcode or similar marking on the container of an FMCG.

Alternatively, or in addition, the range of applications stored in a memory of the augmented mirror is complete. Each application may be "unlocked" by way of a digital "key". The digital key may take the form of a data transmission from a specific FMCG object and may be encoded. An advantage of such an embodiment is a much greater range of potential changes, with only limited amounts of data being transferred from the FMCG to the mirror. However, a disadvantage is the fact that the choice of applications is limited to what is pre-programmed into the mirror.

A connection between the computer module of the augmented mirror and the user objects could be achieved via any one or more of: light, sound, local electronic means, vibration, object form, object movement and object graphics. Where graphic on a FMCG container or other object acts as either a digital key or a source of data, it may be printed in an ink which is only visible in a non-visible part of the electromagnetic spectrum (i.e. under UV or IR light).

In particular, the FMCG object may be a "dumb FMCG". The dumb FMCG does not include a means of actively outputting information or data from itself. Nor is the dumb FMCG capable of carrying out a two-way interaction. In general, the total information content of dumb FMCG is fixed, and the dumb FMCG allows that information to be detected by a system that observes the dumb FMCG by inspection with a camera. The total information content of a dumb FMCG may therefore be conveyed visually. In other words, the information from the dumb FMCG may be determined only from the appearance of the dumb FMCG. The specific markings may be invisible to the human eye under normal circumstances.

The specific markings on the packaging of the dumb FMCG may be especially designed to be easily distinguished and measured by the camera and computer module of the augmented mirror. The specific markings may include, for example, a glyph, a barcode, a 2-dimensional barcode, or a QR code.

A glyph may be a simple geometric shape displayed (for example, printed) on the dumb FMCG packaging. The glyph may be included on the packaging so that it has a high visual contrast relative to the remainder of the dumb FMCG packaging, making it easier for computer module of the augmented mirror to identify the glyph. For example, the glyph may be a simple geometric black shape on a white background. The glyph may not be rotationally symmetric. If the glyph is not rotationally symmetric, then a system observing the glyph with camera is able to identify an angular orientation of the glyph. If the system can also identify the dumb FMCG from the glyph, then the orientation of the glyph can be used to infer the orientation of the dumb FMCG to which it is applied.

The specific markings may enable the mirror to identify the FMCG, for example from a database of glyphs and corresponding FMCGs. The database may be stored locally to the mirror or may be stored remotely from the mirror. If the database is stored remotely, then the mirror may query the database over a network, for example, the internet.

Specific protocols may be used to prevent data transmitted by the mirror from being picked up by any device other than the FMCG where the FMCG is capable of receiving data. This may be achieved by encoding the data so that it can only be read by the objects concerned.

Furthermore, a transfer system such as NFC or Bluetooth which is short range can be used which advantageously means that only devices within a certain distance can interact with the mirror.

Finally, the transfer system chosen may be keyed to a specific recognition parameter, for example visual recognition of a physical FMCG object. In this way, an extra check is provided which checks the visual data, determines the shape of an object, checks the shape against a rule stored in the memory of the mirror, and only performs the transfer of information if the shape of the FMCG object matches the shape as defined by the rule in the memory.

Where there is a network connection, this may be a one way connection so that incoming data only is permitted. In this way security risks are minimised but the mirror can still receive updates and can also interact with external devices e.g. weather forecasts. Where security is not an issue at all, a two way connection may exist so that data can be transferred in and out of the system via the mirror.

A further embodiment of the present invention is described below in relation to FIGS. 14 and 15.

As per previous embodiments, the computation module 4 of the augmented mirror 201 is configured to receive visual information from the camera; to process the information; and display one or more images on the display screen based upon the processed information. However, this embodiment differs from those described above in relation to FIGS. 1 and 2 in that the field of view over which visual information is processed by the computational module is reduced to visual information from within a visual corridor 202, 203 the visual corridor corresponding to a subset of the field of view of the camera.

Accordingly, the height and width of the visual corridor may be determined on the basis on the physical dimensions of the mirror. For example, the visual corridor may correspond to locations at which a user can see themselves reflected in the mirror. In this way, the mirror only interacts with a user who can see themselves in the mirror. Implementing such a visual corridor prevents inadvertent interaction of the mirror with users outside the visual corridor.

In some embodiments, the extent of the visual corridor is defined for the particular mirror, and is applied to all applications and/or functions implemented by that mirror. Furthermore, the same visual corridor may be used with a number of hardware configurations of a particular mirror.

Figure 14:
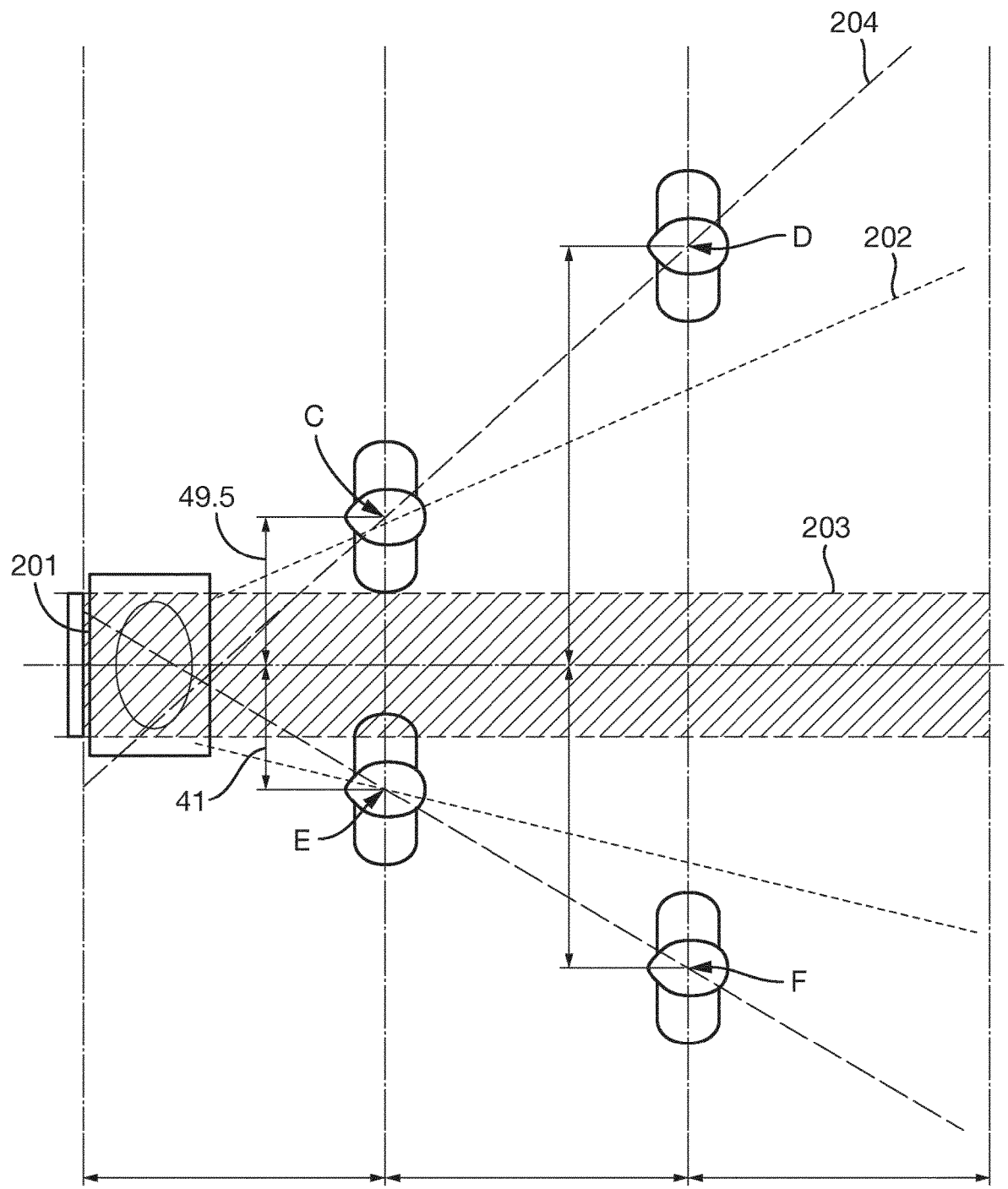
FIG. 14 shows a schematic diagram of an alternative augmented mirror with a visual corridor functionality.

FIG. 14 shows two possible options for a visual corridor; one which is cone shaped, and one which is rectangular shaped. Note that, in either case, all four users C, D, E, and F fall outside of the visual corridor despite that fact that they fall within the field of view 204 of the camera.

For mirror applications, the user is only interested in a range of view over which the user's reflection is visible. This is significantly less than the overall field of view of a standard camera e.g. for use with a video game console.

Since data outside the visual corridor is thrown away before calculations are performed, the visual corridor results in simplification of calculations as well as a reduction in the memory space required.

In the embodiment shown in FIG. 14, the camera is an RGB-D device which includes a depth scanner for capturing an image and associated depth information of a user of the mirror. The RGB-D device includes input software to extract the skeletal data points of each detected person within the field of view of the camera.

Figure 15:
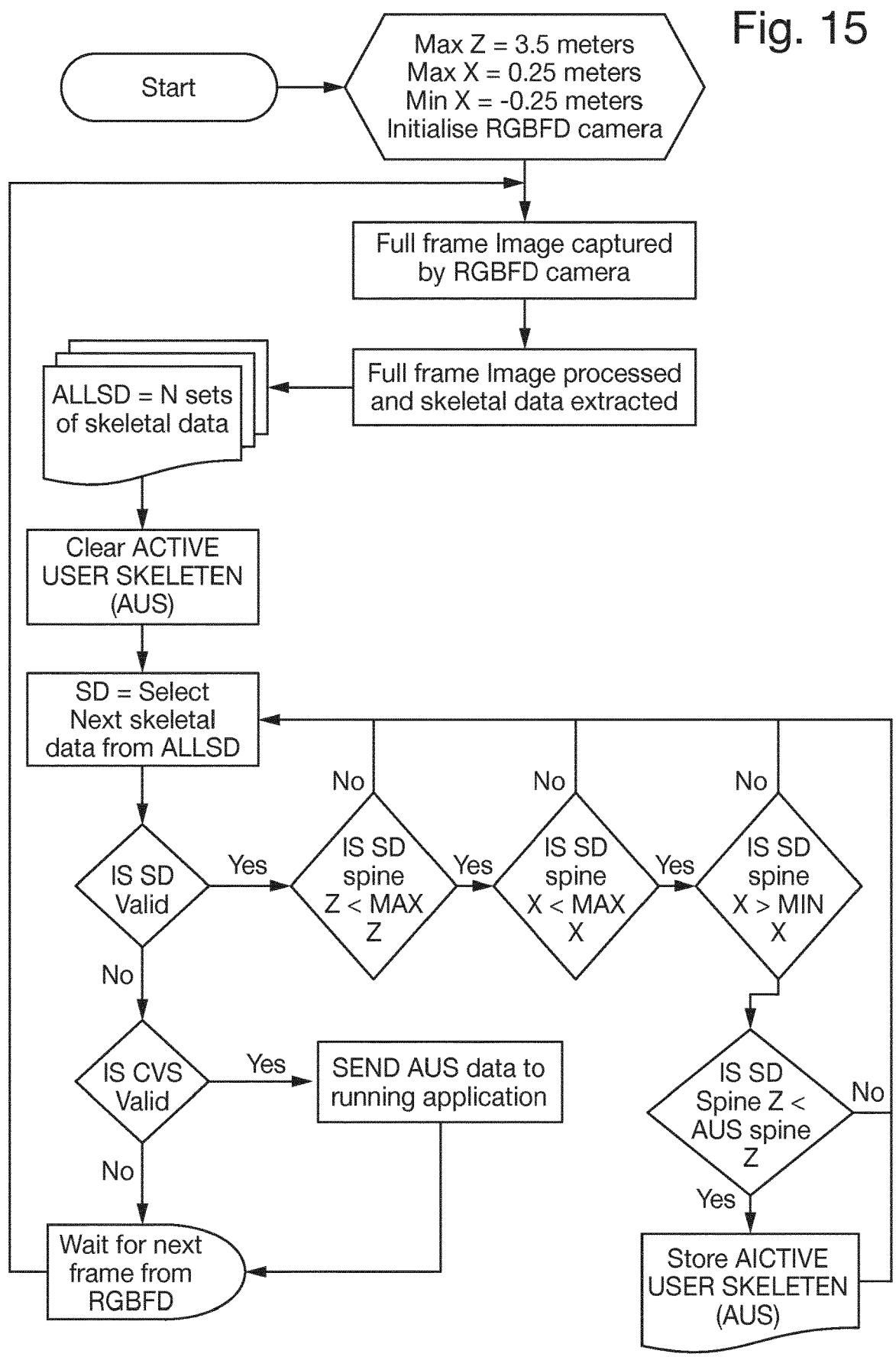
FIG. 15 shows a schematic diagram of a method carried out by the augmented mirror of FIG. 14.

The process carried out by the augmentation mirror of FIG. 14 is shown in a flowchart in FIG. 15.

A full frame (i.e. an image over the possible field of view of the camera) is captured by the RGB-D camera. The visual corridor is provided by way of maximum x, y and z inputs at the RGB-D device which represent a subset of the full frame.

The computational module includes elimination software, the elimination software configured to: processes the skeletal points extracted by the RGB-D device; extract the position of a specific skeletal region for each user detected by the RGB-D device; discard data corresponding to any user whose specific skeletal region is located outside the visual corridor.

The skeletal region may be the spine of the user, or may be another body part or area such as a head, arm, or leg. A central region on the body such as the spine or head may be advantageous.

The elimination software may carry out the step of locating the real world Z and X coordinates of the specific skeletal point for each detected skeleton and discarding visual data of users relating for whom the real world X and Z coordinates lay outside of the visual corridor.

The elimination software is further configured to discard data corresponding to any user other than the one whose specific skeletal region is closest to the RGB-D device. That is to say, the user for which the z-coordinate of the specific skeletal region (e.g. the spine) has the lowest value.

In addition to the elimination software, the computational module further comprises: execution software which receives the non-discarded data from the elimination software and processes this data.

The augmented mirror of the present embodiment can include software to interact with portable user devices. In such examples, the portable electronic device includes features which activate only when they appear in the corridor. For example, an interactive smart tooth brush will become activated once it is moved into the visual corridor.

This can be achieved by portable electronic device including an LED and a photo receiver. When light from the LED is reflected by the mirror and received by the photo receiver, at least one feature on the portable electronic device will switch from an "off" configuration to an "on" configuration when it "sees" itself in the mirror.

The maximum x, y and z co-ordinates (or polar co-ordinates if a more complicated shaped corridor is chosen) corresponds to the furthest "left" or "right" a person could be before their information will not be processed by the computational module. These limits can be set to correspond to the furthest positions at which a user can stand in front of the mirror and still see their reflection (i.e. the "outer limits" of the corridor").

In some embodiments, additional software located at the computational module may be programmed to "lock on" to the location of a user's head.

As the user moves in, their skeleton is picked up by the RGB-D device. This outputs coordinates for the position of their head. For example, the coordinates may correspond to the centre each user's head or the topmost point of each user's head. These coordinates are then used to create a dynamic "bounding box"; an area which would roughly encompass their head. The coordinates of this bounding box will move as the user moves.

These bounding box coordinates are then applied to the camera image. In this way, the camera image shows the head of the user, and is "locked on" to their head, regardless of where they move it within the sightlines of the RGB-D device.

One application of the bounding box is to finesse the face recognition. The facial recognition software is only applied to the visual data within the bounding box, which reduces the size of the image area where a face has to be matched with one in a database located within a memory of the computational module.

Figure 16:
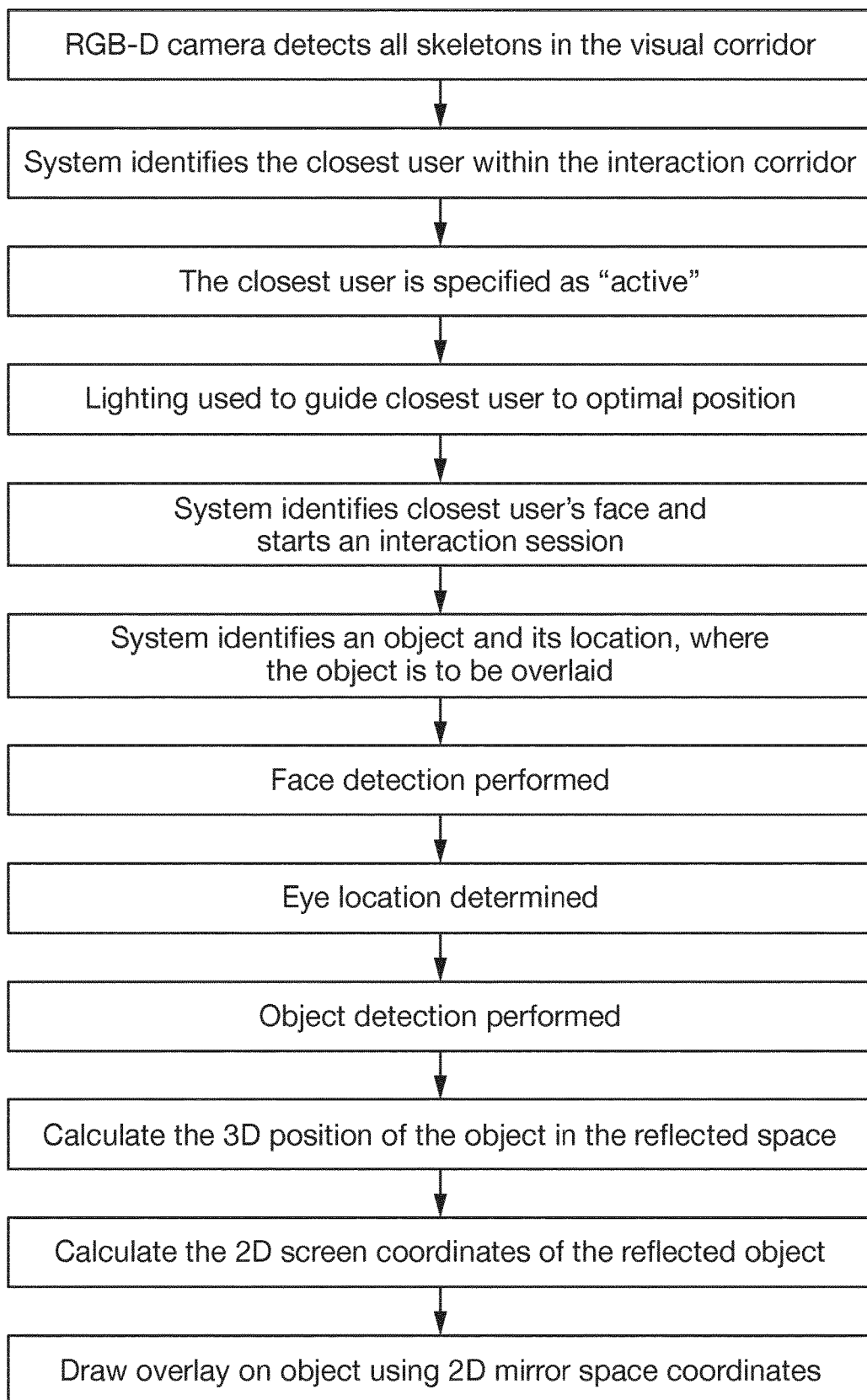
FIG. 16 shows a schematic diagram of a method of operating external lighting and drawing/displaying an overlay of an object.

FIG. 16 illustrates a methodology and associated steps for drawing on the screen an overlay that appears to the user to be on an object reflected in the mirror, from the perspective of a user of the mirror. The object may be a part of the user or may be an object held by the user or located on the user.

The method illustrated begins by detecting all skeletons in the visual corridor (the visual corridor is described above). In the second step, the system identifies which of the skeletons within the visual corridor is the closest to the mirror. This is an important step because there may be multiple people in the visual corridor. The closest user is identified as "active", and is the user whose actions are monitored by the mirror, and who will interact with the mirror.

Whilst the active user is within the visual corridor, he/she may not be at the optimal position for interaction with the mirror. In order to have the active user move to the optimal position, the lighting surrounding the mirror can be controlled as described above to direct the user to the optimal user in an intuitive manner.

When the active user is in the optimal position, or close to it, the system identifies the face of the active user and starts an interaction session. The system also identifies an object that can be seen by the camera (for example, a dumb FMCG) and the location of that object. The object is to be overlaid with graphics, as perceived by the active user.

Next, the active user's face is detected, and subsequently the position of the eyes of the active user is identified (the 3D coordinates of the active user's eyes). Object detection of the object is also performed.

From the 3D coordinates of the object, the 3D position virtual position of the object in the reflected space is calculated. To calculate the point on the mirror surface where the object appears to the user, the computational module of the mirror: measures the perpendicular distance from the mirror surface to the object, computes a 3D virtual position at the same perpendicular distance from the mirror on the opposite side of the mirrored surface to the object; calculates a line of sight from the 3D virtual position to the 3D coordinates of the user's eyes; and determine the point at which the plane of the mirror surface intersects this line of sight. This point of intersection corresponds to the point on the mirror surface where the object appears to the user in terms of the 2D coordinates on the mirror surface.

An overlay for the object is then drawn on the display screen at the point of intersection on the mirror surface. This overlay coincides with the position of the reflection of the object, as perceived by the user, and so the overlap appears to be coincident with the object. The object may be part of the user themselves. For example, the overlay may comprise an arrow that appears to point to the object. The overlay may be an encirclement, so the overlap appears to surround the object. In this way, objects may be highlighted to a user of the mirror.

In connection with any of the embodiments described hereon, the augmented mirror may include software programmed to produce two screen outputs. The screen itself may be a dual view screen wherein the screen provides two separate visual outputs and therefore receives two visual outputs from the computer module; a first visual output viewable over a first range of angles; and a second visual output viewable over a second range of angles, the second range of angles chosen so that there is no overlap with the first range of angles.

Such a feature may be used in a salon so that the customer sees something different to hairdresser/salon worker.

In any of the embodiments described herein, the augmented mirror may be triggered by an audio or visual input. Visual triggers could include specific actions in relation to a product such as taking a lid off container. In this case, software in the computer module could be taught or pre-programmed to recognise such an event using object learning.

An example of an object learning process for use with any one of the aspects or embodiments described herein is set out below:

1. The user presents an object to the mirror, and uses voice commands to initiate object learning, including giving it a unique id;
2. The mirror takes a still image using its camera, and displays it on the mirror. An initial segmentation of the object is done based on the user's hand location, colour, and depth information;
3. The user fine-tunes the segmentation using voice commands'
4. Once complete, the RGB-D representation of the object is stored as a positive example of the object;
5. A number of negative examples are also sampled from other parts of the image;
6. A statistical machine learning model is updated with the new training data collected in steps 4 and 5;
7. The user presents the object to the mirror in a different position, and the mirror segments the object's location using a weighted scoring of the initial segmentation procedure of step 2 and the machine learning prediction of the model trained in step 6. It also shows the models' prediction for the user to evaluate for correctness; and
8. Steps 3-7 are repeated until the user is satisfied with the automatic recognition results of the system.

A further embodiment of the present invention is described below. This embodiment concerns a "cold start" mechanism that can be used in combination with any of the aspects and/or embodiments described above.

In this embodiment, the computer module includes "cold start software" configured to extract information about a user.

The software obtains inputs from one or more sensors of the augmented mirror system and extracts pertinent information about an individual.

In this way, a degree of personalised information about a user can be obtained and stored passively without the user having to actively answer questions. This provides a quicker, more seamless user interaction.

A cold start mechanism is particularly useful in relation to use of the augmented mirror for product recommendation. Traditionally, product recommendation includes the completion of a questionnaire to describe hair and other attributes relevant to making the recommendation; for example:

Hair colour
Hair length
Hair texture
Hair movement
Preferred fashion style
Current Hair care regime Once the answers have been inputted, a traditional questionnaire system can make a recommendation based on the information inputted by the user. The process of entering data can be lengthy and is often frustrating for a user.

The following gives an example of how the "cold start" mechanism could be used to improve the recommendation process:

User approaches mirror and a visual image is captured;
cold start software applies an algorithm for detect hair region;
cold start software applies an algorithm to detect face region
Information about hair and face are extracted from the relevant regions, for example:
1. Hair colour
2. Hair length
3. Hair texture
4. Hair movement
5. Preferred fashion style
The extracted information is used alone or alongside a questionnaire that is reduced in length from that in the traditional method to make a recommendation.

The cold start software, when applied to product recommendation, enables personalised product or regime recommendations faster, by using visual information assessed from a consumer's Smart Mirror reflection to reduce the need for data collected by traditional questionnaire methods. Business benefits may also exist such as reduced 'user drop-out' during the personalisation process. This may be relevant in-store or in-home.

The software could be adapted to capture information over an extended amount of time to identify a regime or trends in behaviour by the user.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The embodiments described herein are all relate to augmented mirrors with a partially silvered surface, it is envisaged that the concepts described herein, particularly the concept of the visual corridor could also be applied to a simple display screen without an extra partially silvered coating.

All references referred to above are hereby incorporated by reference.

The invention claimed is:

1. An augmented mirror comprising:
a partially silvered mirror surface;
a screen disposed underneath the mirror surface;
a camera having a field of view;
external lighting; and
a computation module configured to:
  receive visual information from the camera;
  reduce the visual information from the field of view to a visual corridor, the visual corridor based on at least one of a shape of the mirror surface or a size of the mirror surface and sized to match a region over which a user can see their reflection in the mirror surface;
  process the visual information over the visual corridor;
  detect that the user has entered the field of view of the camera;
  determine a perpendicular distance of the user relative to the mirror surface;
  compare the perpendicular distance to an optimal distance to determine a difference;
  after detecting that the user has entered the visual corridor, control the external lighting to gradually increase illumination of the external lighting as the difference decreases;
  display one or more images on the screen based upon the processed visual information;
  initiate a timer based on the visual information;
  compare the timer to a time threshold; and
  vary illumination of the external lighting when the timer exceeds the time threshold.

2. The augmented mirror of claim 1, wherein the camera is an RGB-D device which includes a depth scanner for capturing an image and associated depth information of the user.

3. The augmented mirror of claim 2, wherein the RGB-D device includes input software to extract skeletal data points of each detected person within the field of view.

4. The augmented mirror of claim 3, wherein the computation module includes elimination software configured to:
process the skeletal data points extracted by the RGB-D device;
extract a position of a specific skeletal region for each detected person detected by the RGB-D device; and
discard data corresponding to any detected person whose specific skeletal region is located outside of the visual corridor.

5. The augmented mirror of claim 4, wherein the elimination software is further configured to:
discard data corresponding to any detected person other than a selected detected person, where the selected detected person has a specific skeletal region that is closest to the RGB-D device.

6. The augmented mirror of claim 5, wherein the computation module further comprises:
execution software which receives non-discarded data from the elimination software and processes the non-discarded data.

7. The augmented mirror of claim 2, wherein the visual corridor is provided by way of maximum x, y, and z inputs at the RGB-D device.

8. The augmented mirror of claim 1, wherein the computation module is configured to perform a linear progression of illumination of the external lighting as the illumination of the external lighting is gradually increased.

9. The augmented mirror of claim 8, wherein the computation module is configured to perform two linear progressions of illumination of the external lighting as the illumination of the external lighting is gradually increased, the computation module being configured such that the two linear progressions meet when the user is located at the optimal distance.

10. The augmented mirror of claim 1 in combination with a portable electronic device.

11. The augmented mirror of claim 1, wherein the computation module is further configured to start an interaction session when the user is at the optimal distance.

12. A mirror system comprising:
a mirror surface;
a cam era;
a light panel comprising a first lighting element, a second lighting element, and a plurality of third lighting elements positioned between the first lighting element and the second lighting element; and
a computation module configured to:
  receive visual information from the camera;
  reduce the visual information to a visual corridor, the visual corridor based on at least one of a shape of the mirror surface or a size of the mirror surface and sized to match a region over which a user can see their reflection in the mirror surface;
  determine, based on the visual information, a position of the user relative to the mirror surface;
  initiate a timer based on the visual information;
  compare the timer to a time threshold;
  vary illumination of at least one of the first lighting element and the second lighting element when the timer exceeds the time threshold;
  compare the position to an optimal position to determine a difference; and
  while the first lighting element and the second lighting element are illuminated, gradually increase illumination of the plurality of third lighting elements as the difference decreases.

13. The mirror system of claim 12, wherein the computation module is further configured to:
detect that a user has entered a field of view of the camera; and
after detecting that the user has entered the field of view of the camera, illuminate the first lighting element and the second lighting element.

14. The mirror system of claim 12, wherein the computation module is further configured to start an interaction session when the user is in the optimal position.

15. A mirror system comprising:
a partially silvered mirror surface;

a screen disposed underneath the mirror surface;
a camera having a field of view;
external lighting; and
a computation module configured to:
- receive visual information from the camera over the field of view;
- reduce the field of view to a visual corridor, the visual corridor corresponding to a subset of the field of view and being based on at least one of a shape of the mirror surface or a size of the mirror surface and sized to match a region over which a user can see their reflection in the mirror surface;
- process the visual information over the visual corridor;
- detect that the user has entered the visual corridor;
- after detecting that the user has entered the visual corridor, obtain a distance between the user and the mirror surface;
- compare the distance to an optimal distance to determine a difference;
- control the external lighting to gradually increase illumination of the external lighting as the difference decreases;
- display one or more images on the screen based upon the processed visual information;
- initiate a timer based on the visual information;
- compare the timer to a time threshold; and
- vary illumination of at least the external lighting when the timer exceeds the time threshold.

16. The mirror system of claim 15, wherein the computation module is further configured to start an interaction session when the user is at the optimal distance or close to the optimal distance.

* * * * *